(12) United States Patent
Lin et al.

(10) Patent No.: US 12,272,116 B2
(45) Date of Patent: Apr. 8, 2025

(54) METHOD AND APPARATUS FOR DETERMINING ITEM NAME, COMPUTER DEVICE, AND STORAGE MEDIUM

(71) Applicant: TENCENT TECHNOLOGY (SHENZHEN) COMPANY LIMITED, Shenzhen (CN)

(72) Inventors: Yugeng Lin, Shenzhen (CN); Dianping Xu, Shenzhen (CN); Bolun Cai, Shenzhen (CN); Yanhua Cheng, Shenzhen (CN); Chen Ran, Shenzhen (CN); Minhui Wu, Shenzhen (CN); Mei Jiang, Shenzhen (CN); Yike Liu, Shenzhen (CN); Lijian Mei, Shenzhen (CN); Huajie Huang, Shenzhen (CN); Xiaoyi Jia, Shenzhen (CN); Jinchang Xu, Shenzhen (CN); Zhikang Tan, Shenzhen (CN); Haoyu Li, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 458 days.

(21) Appl. No.: 17/728,762

(22) Filed: Apr. 25, 2022

(65) Prior Publication Data

US 2022/0254143 A1 Aug. 11, 2022

Related U.S. Application Data

(63) Continuation of application No. PCT/CN2021/079510, filed on Mar. 8, 2021.

(30) Foreign Application Priority Data

Apr. 16, 2020 (CN) .......................... 202010299942.X

(51) Int. Cl.
*G06V 10/74* (2022.01)
*G06F 16/55* (2019.01)
(Continued)

(52) U.S. Cl.
CPC ............ *G06V 10/761* (2022.01); *G06F 16/55* (2019.01); *G06F 16/56* (2019.01);
(Continued)

(58) Field of Classification Search
None
See application file for complete search history.

(56) References Cited

U.S. PATENT DOCUMENTS 10,706,098 B1 * 7/2020 Ramesh ............ G06Q 30/0641
11,037,307 B2 6/2021 Chen et al.
(Continued)

FOREIGN PATENT DOCUMENTS

CN 101542531 A 9/2009
CN 101751439 A 6/2010
(Continued)

OTHER PUBLICATIONS

The World Intellectual Property Organization (WIPO) International Search Report for PCT/CN2021/079510 Jun. 2, 2021 3 Pages (including translation).
(Continued)

*Primary Examiner* — Bernard Krasnic
(74) *Attorney, Agent, or Firm* — ANOVA LAW GROUP, PLLC

(57) ABSTRACT

A method includes: obtaining a first image including a target item; selecting a plurality of reference images corresponding to the first image from a database; performing word segmentation on item text information corresponding to the plurality of reference images to obtain a plurality of words; and extracting a key word meeting a reference condition
(Continued)

from the plurality of words, and determining the extracted key word as an item name of the target item.

19 Claims, 12 Drawing Sheets

(51) Int. Cl.
*G06F 16/56* (2019.01)
*G06F 16/58* (2019.01)
*G06T 7/00* (2017.01)
*G06V 10/26* (2022.01)
*G06V 10/764* (2022.01)
*G06V 30/148* (2022.01)
*G06V 30/19* (2022.01)

(52) U.S. Cl.
CPC ........ *G06F 16/5866* (2019.01); *G06T 7/0002* (2013.01); *G06V 10/267* (2022.01); *G06V 10/764* (2022.01); *G06V 30/158* (2022.01); *G06V 30/19107* (2022.01); *G06T 2207/30168* (2013.01)

(56) References Cited

U.S. PATENT DOCUMENTS

| 2007/0168357 A1* | 7/2007 | Mo ..................... G06F 16/9535 |
| 2009/0164213 A1* | 6/2009 | Lennington ............ G06V 20/00 704/E15.001 |
| 2013/0138636 A1* | 5/2013 | Jin ..................... G06F 16/5866 707/723 |
| 2014/0355825 A1 | 12/2014 | Kim et al. |

FOREIGN PATENT DOCUMENTS

| CN | 102855298 A | 1/2013 |
| CN | 103955543 A | 7/2014 |
| CN | 106815351 A | 6/2017 |
| CN | 107016368 A | 8/2017 |
| CN | 107122349 A | 9/2017 |
| CN | 111506758 A | 8/2020 |
| TW | 201828109 A | 8/2018 |
| TW | I660310 B | 5/2019 |

OTHER PUBLICATIONS

Taiwan Intellectual Property Office Examination report for Application No. 110109220 Jan. 25, 2022 14 pages.
The State Intellectual Property Office of the People's Republic of China (SIPO) Office Action 2 for 202010299942.X Sep. 9, 2023 8 Pages (including translation).

* cited by examiner

METHOD AND APPARATUS FOR DETERMINING ITEM NAME, COMPUTER DEVICE, AND STORAGE MEDIUM

RELATED APPLICATION

This application is a continuation application of PCT Patent Application No. PCT/CN2021/079510 filed on Mar. 8, 2021, which claims priority to Chinese Patent Application No. 202010299942.X, entitled "METHOD AND APPARATUS FOR DETERMINING ITEM NAME, COMPUTER DEVICE, AND STORAGE MEDIUM" and filed with the China National Intellectual Property Administration on Apr. 16, 2020, all of which are incorporated herein by reference in entirety.

FIELD OF THE TECHNOLOGY

Embodiments of the present disclosure relate to the field of computer technologies, and in particular, to a method and an apparatus for determining an item name, a computing device, and a storage medium.

BACKGROUND

With the development of computer technologies, a user may obtain item information of an item in many ways, for example, may search for the item information using text, or may search for the item information using pictures.

In certain existing technologies, an item searching method is provided, where searching is performed according to a first image including a target item, and item information corresponding to another image similar to the first image is used as item information of the target item.

SUMMARY

Embodiments of the present disclosure provide a method and an apparatus for determining an item name, a computing device, and a storage medium. The technical solutions are as follows:

In one aspect, the present disclosure provides a method for determining an item name of a target item, the method including: obtaining a first image including a target item; selecting a plurality of reference images corresponding to the first image from a database, the database including a plurality of images and item information corresponding to the plurality of images, the item information corresponding to the images being used for describing items included in the images, and the item information corresponding to the images including at least item text information; performing word segmentation on the item text information corresponding to the plurality of reference images to obtain a plurality of words; and extracting a key word meeting a reference condition from the plurality of words, and determining the extracted key word as the item name of the target item.

In certain embodiment(s), the method further includes: displaying the item information corresponding to the plurality of reference images in a display interface.

In certain embodiment(s), the obtaining a first image including a target item includes: obtaining the first image including the target item in response to that a trigger operation on an item recognition option is detected through the display interface.

In another aspect, the present disclosure provides an apparatus for determining an item name of a target item, the apparatus including: a memory storing computer program instructions; and a processor coupled to the memory and configured to execute the computer program instructions and perform: obtaining a first image including the target item; selecting a plurality of reference images according to the first image from a database, the database including a plurality of images and item information corresponding to the plurality of images, the item information corresponding to the images being used for describing items included in the images, and the item information corresponding to the images including item text information; performing word segmentation on the item text information corresponding to the plurality of reference images to obtain a plurality of words; and extracting a key word meeting a reference condition from the plurality of words, and determining the extracted key word as the item name of the target item.

In yet another aspect, the present disclosure provides a non-transitory computer-readable storage medium storing computer program instructions executable by at least one processor to perform: obtaining a first image including the target item; selecting a plurality of reference images according to the first image from a database, the database including a plurality of images and item information corresponding to the plurality of images, the item information corresponding to the images being used for describing items included in the images, and the item information corresponding to the images including item text information; performing word segmentation on the item text information corresponding to the plurality of reference images to obtain a plurality of words; and extracting a key word meeting a reference condition from the plurality of words, and determining the extracted key word as the item name of the target item.

Other aspects of the present disclosure can be understood by those skilled in the art in light of the description, the claims, and the drawings of the present disclosure.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DESCRIPTION OF EMBODIMENTS

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

When and as applicable, the term "an embodiment," "one embodiment," "some embodiment(s), "some embodiments," "certain embodiment(s)," or "certain embodiments" may refer to one or more subsets of all possible embodiments. When and as applicable, the term "an embodiment," "one embodiment," "some embodiment(s), "some embodiments," "certain embodiment(s)," or "certain embodiments" may refer to the same subset or different subsets of all the possible embodiments, and can be combined with each other without conflict.

The terms "first", "second", and the like used in the present disclosure may be used for describing various concepts in the present disclosure. However, the concepts are not limited by the terms unless otherwise specified. The terms are merely used for distinguishing one concept from another concept. For example, without departing from the scope of the present disclosure, a first image may be referred to as a second image, and similarly, the second image may be referred to as the first image.

For the terms "at least one", "a plurality of", "each", and "any" used in the present disclosure, "at least one" refers to "one", "two", or "more", "a plurality of" refers to "two" or "more", "each" refers to "each of a plurality of corresponding", and "any" refers to "any one of a plurality of". For example, when "a plurality of elements" refers to "three elements", "each" refers to "each of the three elements", and "any" refers to "any one of the three elements", that is, may be the first element, the second element, or the third element.

The item searching method provided in certain existing technologies only considers item images, so that the accuracy of determined item information is poor. Therefore, the embodiments of the present disclosure provide a method for determining an item name, to improve the accuracy of a determined item name. The method for determining an item name is applicable to a computing device, and the computing device includes a terminal or a server. In certain embodiment(s), the terminal is a terminal of a plurality of types such as a mobile phone, a computer, or a tablet computer. In certain embodiment(s), the server is a server, or a server cluster including a plurality of servers, or a cloud computing service center.

Figure 1:
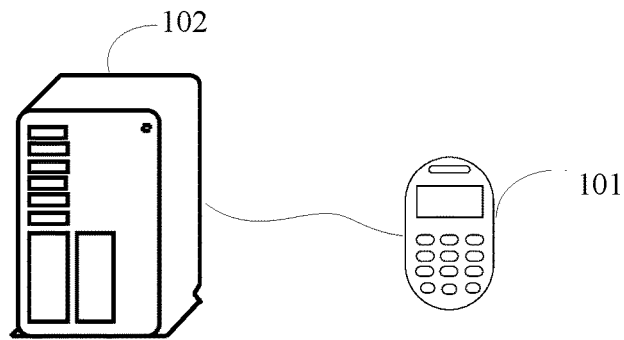
FIG. 1 is a schematic diagram of an implementation environment according to embodiment(s) of the present disclosure.

FIG. 1 is a schematic structural diagram of an implementation environment according to an embodiment of the present disclosure. As shown in FIG. 1, the implementation environment includes a terminal 101 and a server 102. The terminal 101 and the server 102 establish a communication connection and perform interaction by using the established communication connection. In certain embodiment(s), the terminal 101 is a terminal of a plurality of types such as a mobile phone, a computer, or a tablet computer. In certain embodiment(s), the server 102 is a server, or a server cluster including a plurality of servers, or a cloud computing service center.

In certain embodiment(s), the terminal 101 obtains a first image including a target item and transmits the first image to the server 102. The server 102 selects a plurality of reference images similar to the first image from a database, performs word segmentation on item text information corresponding to the plurality of reference images to obtain a plurality of words, extracts a key word meeting a preset condition from the plurality of words, and determines the key word as an item name of the target item. The server 102 transmits the item name to the terminal 101, and the terminal 101 displays the item name for a user to view.

The method provided in the embodiments of the present disclosure can be applicable to an item recognition scenario.

For example, under a scenario of obtaining item information:

After obtaining the first image including the target item, the terminal uses the method for determining an item name provided in the embodiments of the present disclosure to determine an item name of the target item, performs searching by using the item name, and displays item information obtained through searching in a display interface for a user to view.

In another example, under a scenario of obtaining an item shopping link:

After obtaining the first image including the target item, the terminal uses the method for determining an item name provided in the embodiments of the present disclosure to determine an item name of the target item, performs searching by using the item name to obtain a shopping link corresponding to the item name, and displays the shopping link in the display interface, for a user to view the shopping link and purchase the target item.

Figure 2:
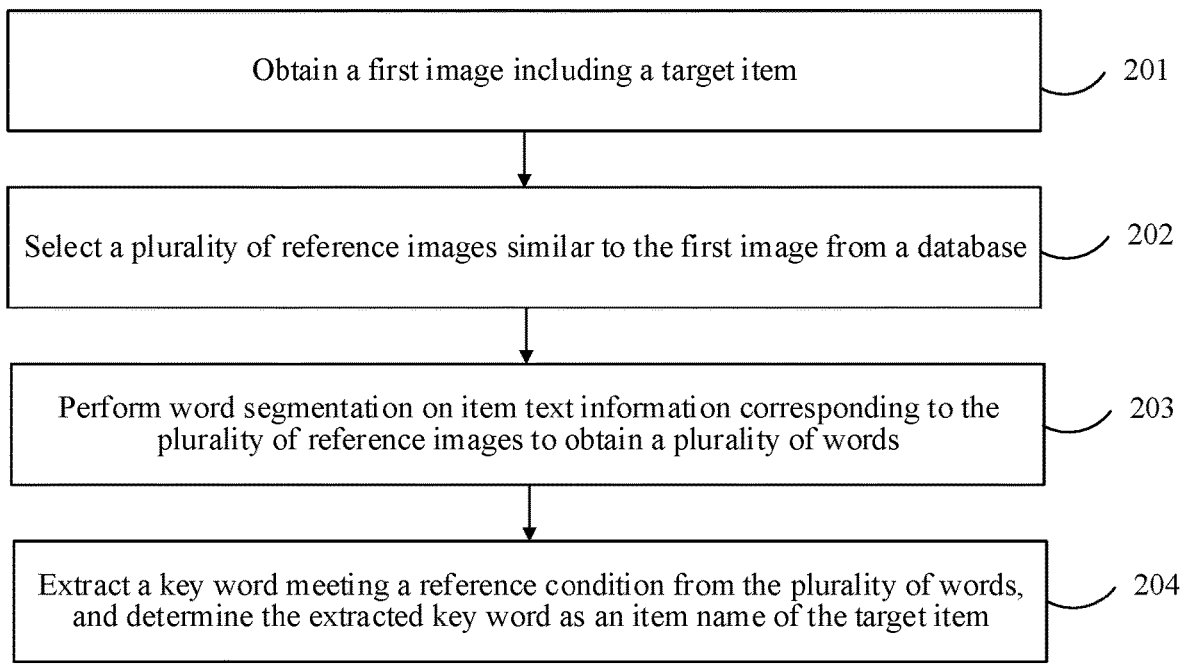
FIG. 2 is a schematic flowchart of a method for determining an item name according to embodiment(s) of the present disclosure.

FIG. 2 is a flowchart of a method for determining an item name according to an embodiment of the present disclosure. The method is applicable to a computing device, and as shown in FIG. 2, the method includes:

201: Obtain a first image including a target item.

The target item is an item to be recognized. In certain embodiment(s), the target item is any item such as a mobile phone, a computer, a book, a shoe, or cosmetics. In certain embodiment(s), the target item is located in any region in the first image, for example, a middle region or an upper left corner region in the first image. In certain embodiment(s), in addition to the target item, the first image further includes other items such as a desk, a chair, and a wall surface.

202: Select a plurality of reference images corresponding to the first image from a database.

The database includes a plurality of images and item information corresponding to the plurality of images, and the item information corresponding to an image is used for describing an item included in the image.

The item information corresponding to the image includes at least item text information. In certain embodiment(s), the item text information is title information and brief introduction information corresponding to the item included in the image and used for describing the item. In certain embodiment(s), in addition to the item text information, the item information further includes item link information or other information of the item. In certain embodiment(s), the item link information is a shopping link for purchasing the item, a link address corresponding to a picture including the item, or a link address corresponding to a page used for describing the item.

In the embodiments of the present disclosure, the database includes a plurality of images and item information corresponding to the plurality of images. In certain embodiment(s), in the database, each image corresponds to one piece of item information, or a plurality of images correspond to one piece of item information, or a plurality of images correspond to a plurality of pieces of item information. For example, in the plurality of images in the database, if different images include different items, and different item information is used for describing different items, each image corresponds to one piece of item information; if the plurality of images include a same item, and different item information is used for describing different items, a plurality of images correspond to one piece of item information in the database; and if the plurality of images include a same item, and different item information is used for describing a same item, a plurality of images correspond to a plurality of pieces of item information in the database. A correspondence between images and item information in the database includes at least one of the three correspondences.

A reference image is an image similar to the first image in the plurality of images, and the reference image similar to the first image indicates that target items included in the reference image and the first image are similar. The plurality of reference images are two or more reference images.

203: Perform word segmentation on item text information corresponding to the plurality of reference images to obtain a plurality of words.

The item text information includes a plurality of characters, and word segmentation is to divide the plurality of characters included in the item text information to obtain a plurality of words. In certain embodiment(s), the plurality of words include a same word. In certain embodiment(s), the plurality of words include different words.

204: Extract a key word meeting a reference condition from the plurality of words, and determine the extracted key word as an item name of the target item.

The key word is one or more words in the plurality of words. In the plurality of words, whether each word meets the reference condition is determined, and a word meeting the reference condition is used as the key word. The reference condition is a condition met by the item name included in the item text information, and the key word meeting the reference condition is a word that can reflect meanings described by the plurality of words, so that the determined key word is used as the item name of the target item.

According to the method provided in the embodiments of the present disclosure, the plurality of reference images are images similar to the first image, so that items in the plurality of reference images are similar to the target item in the first image, and the target item can be also described by the item text information of the reference images. By obtaining the item text information of the plurality of reference images, the accuracy of the obtained item text information is improved, and a key word meeting the reference condition is extracted from the obtained item text information, so that the accuracy of the obtained key word is improved, thereby improving the accuracy of the determined item name.

In certain embodiment(s), the extracting a key word meeting a preset condition from the plurality of words includes: determining an average value of word vectors of the plurality of words as a center vector; and determining a distance between each word vector in the word vectors and the center vector, and determining a word corresponding to a word vector having a smallest distance as the key word meeting the preset condition.

In certain embodiment(s), the performing word segmentation on item text information corresponding to the plurality of reference images to obtain a plurality of words includes:
performing word segmentation on the item text information corresponding to the plurality of reference images according to a plurality of preset lengths, to obtain a word whose length is equal to each preset length separately.

In certain embodiment(s), the extracting a key word meeting a preset condition from the plurality of words, and determining the extracted key word as an item name of the target item includes: determining appearance frequency of the plurality of words in the item text information corresponding to the plurality of reference images; and selecting, from the plurality of words, a word having a largest length and whose appearance frequency is higher than a preset threshold, and determining the selected word as the key word meeting the preset condition; or selecting, from the plurality of words, a word having the highest appearance frequency, and determining the selected word as the key word meeting the preset condition.

In certain embodiment(s), the obtaining a first image including a target item includes: obtaining an original image including the target item; performing item detection on the original image to determine a region in which the target item is located in the original image; and extracting an image of the region from the original image to obtain the first image.

In certain embodiment(s), the database includes images belonging to a plurality of categories; and the selecting a plurality of reference images similar to the first image from a database includes: determining a target category to which the first image belongs; and selecting a plurality of reference images belonging to the target category and similar to the first image from the database.

In certain embodiment(s), the determining a target category to which the first image belongs includes: obtaining a similarity between each category in the plurality of categories and the first image separately; and determining a category having a highest similarity with the first image in the plurality of categories as the target category.

In certain embodiment(s), the database includes a plurality of sub-databases, different sub-databases correspond to different categories, and each sub-database includes at least one image belonging to a corresponding category and item information corresponding to the at least one image; and the obtaining a similarity between each category in the plurality of categories and the first image separately includes: performing the following operations for each sub-database in the plurality of sub-databases: obtaining a similarity between each image in the sub-database and the first image; selecting a plurality of second images from the sub-database according to the similarity between each image and the first image, a similarity between the second image and the first image being higher than a similarity between another image in the sub-database and the first image; and determining an average similarity corresponding to the plurality of second images, and determining the average similarity as a similarity between a category corresponding to the sub-database and the first image.

In certain embodiment(s), the performing word segmentation on item text information corresponding to the plurality of reference images to obtain a plurality of words includes: performing clustering processing on the plurality of reference images to obtain a plurality of image stacks, each image stack including at least two reference images; obtaining a similarity between each image stack and the first image according to similarities between reference images in each image stack and the first image; selecting an image stack having a highest similarity with the first image from the plurality of image stacks, and determining the selected image stack as a target image stack; and performing word segmentation on item text information corresponding to the plurality of reference images in the target image stack to obtain a plurality of words.

In certain embodiment(s), the performing clustering processing on the plurality of reference images to obtain a plurality of image stacks includes: establishing an association relationship between any two reference images in response to that a similarity between any two reference images in the plurality of reference images is higher than a preset threshold; and forming reference images having an association relationship in the plurality of reference images into an image stack, to obtain the plurality of image stacks.

In certain embodiment(s), after the extracting a key word meeting a preset condition from the plurality of words, and determining the extracted key word as an item name of the target item, the method further includes: performing searching according to the item name, to obtain item information corresponding to the item name; and displaying the item information in a current display interface.

In certain embodiment(s), the method further includes: selecting a reference image having a highest quality score from the plurality of reference images, and using the selected reference image as a presentation image of the target item; and displaying the presentation image in the display interface.

In certain embodiment(s), the method further includes: displaying the item information corresponding to the plurality of reference images in the display interface.

In certain embodiment(s), the obtaining a first image including a target item includes: obtaining the first image including the target item in response to that a trigger operation on an item recognition option is detected through the display interface.

Figure 3:
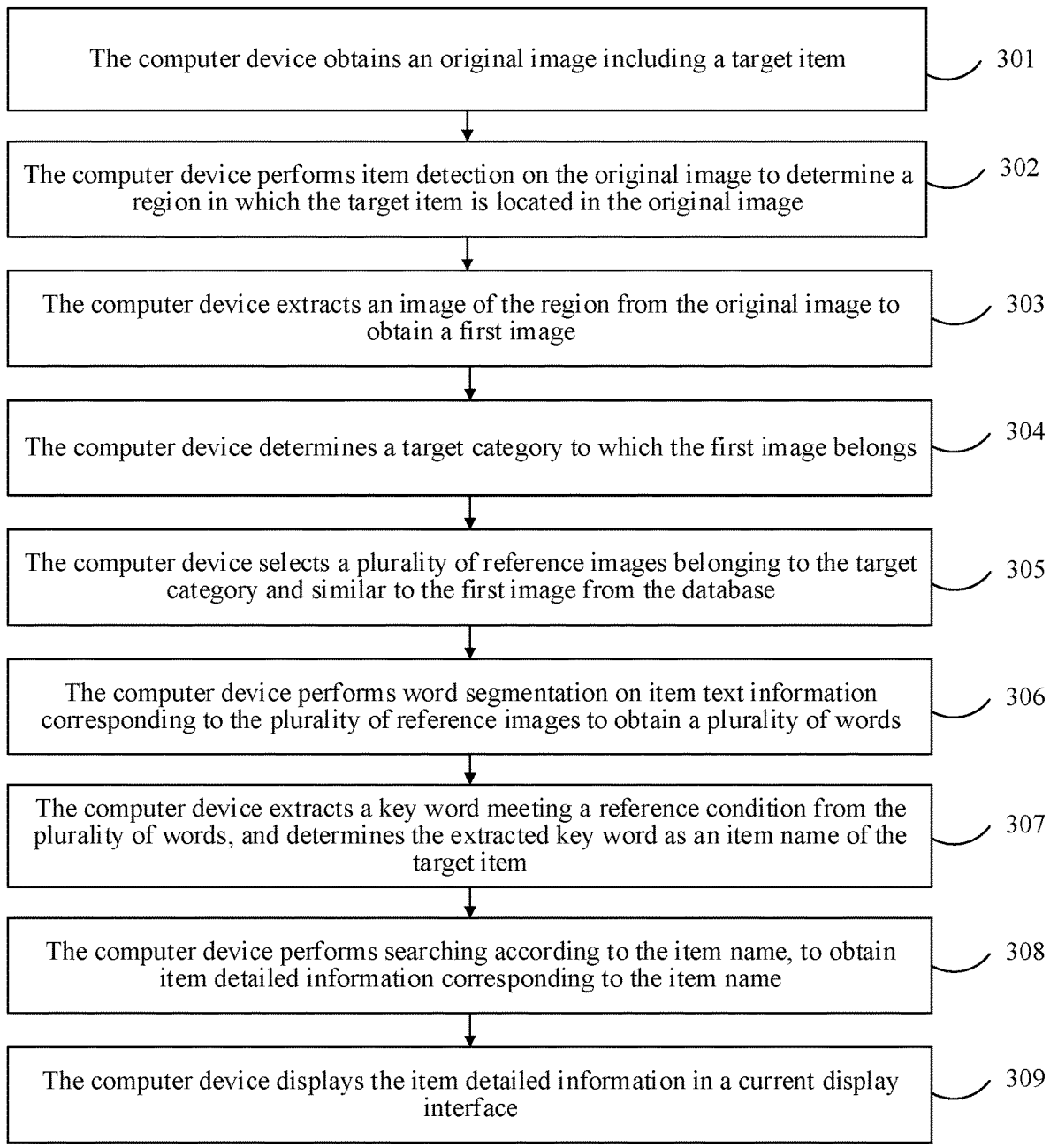
FIG. 3 is a schematic flowchart of a method for determining an item name according to embodiment(s) of the present disclosure.

FIG. 3 is a flowchart of a method for determining an item name according to an embodiment of the present disclosure. The method is applicable to a computing device, and as shown in FIG. 3, the method includes:

301: The computing device obtains an original image including a target item.

The target item is an item to be recognized. In certain embodiment(s), the target item is any item such as a mobile phone, a computer, a book, a shoe, or cosmetics. The target item may be located in any region in the first image, for example, a middle region or an upper left corner region in the first image. In certain embodiment(s), in addition to the target item, the first image further includes other items such as a desk, a chair, and a wall surface.

In certain embodiment(s), the obtaining an original image includes: detecting, by the computing device, a trigger operation on an item recognition option through a display interface, and photographing the target item, to obtain the original image. In certain embodiment(s), the item recognition option is an item recognition button or an item recognition slider bar. For example, the computing device displays the item recognition button in the display interface, detects a trigger operation of a user on the item recognition button, and photographs the target item by using a camera, to obtain the original image.

In certain embodiment(s), the computing device detects a trigger operation on the item recognition option through the display interface, displays a plurality of images in an album, and when detecting a selection operation on an original image in the album, obtains the original image. The album includes a plurality of images, and the original image is any image in the plurality of images.

302: The computing device performs item detection on the original image to determine a region in which the target item is located in the original image.

In addition to the target item, the original image may further include other items, so that item detection may be performed on the original image, to recognize the target item included in the original image, so as to determine a region in which the target item is located in the original image.

In certain embodiment(s), determining a target item includes: performing item detection on the original image to determine a plurality of items included in the original image, selecting an item whose size of an occupied region is the largest from the plurality of items according to a size of an occupied region of each item in the original image, and determining the selected item as the target item.

In certain embodiment(s), determining a target item includes: performing item detection on the original image to determine a plurality of items included in the original image, selecting an item whose distance to a center position of the original image is the smallest from the plurality of items according to a distance between a center position of each item and the center position of the original image, and determining the selected item as the target item.

303: The computing device extracts an image of the region from the original image to obtain a first image.

The first image includes the target item.

The original image may include a plurality of items, to avoid interference of other items and improve the accuracy in recognizing the target item, in this embodiment of the present disclosure, the region in which the target item is located is further extracted, so that items included in the first image is less than the items included in the original image, thereby highlighting the target item. In this way, the target item included in the first image can be recognized subsequently, and a calculation amount is reduced.

This embodiment of the present disclosure is described by extracting the original image to obtain the first image. In another embodiment, steps 301 to 303 may not be performed, and the first image including the target item is obtained by detecting a trigger operation on the item recognition option through the display interface. This process is similar to the process of obtaining the original image through the item recognition option in step 301, and details are not described herein again.

304: The computing device determines a target category to which the first image belongs.

The target category to which the first image belongs refers to a category to which the target item included in the first image belongs. In certain embodiment(s), the target category is any item category such as a shoe category, a clothing category, a luggage category, or a household appliance category.

Figure 4:
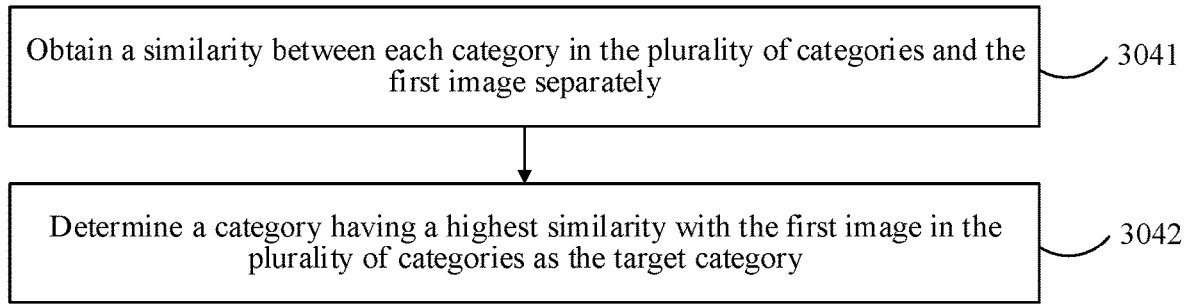
FIG. 4 is a schematic flowchart of a method for determining an item name according to embodiment(s) of the present disclosure.

In certain embodiment(s), as shown in FIG. 4, the determining a target category to which the first image belongs includes the following steps 3041 and 3042.

3041: Obtain a similarity between each category in the plurality of categories and the first image separately.

The similarity between a category and the first image is used for indicating a degree of similarity between the first image and the category, and a higher similarity indicates that a higher possibility that the first image belongs to the category.

In certain embodiment(s), the database includes a plurality of images and item information corresponding to the plurality of images, the item information corresponding to the images is used for describing items included in the images, and the item information corresponding to the images including at least item text information. In addition, the plurality of images included in the database belong to different categories, for ease of storing images of different categories and corresponding item information separately, the database includes a plurality of sub-databases, different sub-databases correspond to different categories, and each sub-database includes at least one image belonging to a corresponding category and item information corresponding to the at least one image. For example, the plurality of sub-databases include a shoe sub-database, a clothing sub-database, a luggage sub-database, and a household appliance sub-database.

In certain embodiment(s), the obtaining a similarity between each category in the plurality of categories and the first image separately includes: performing the following operations for each sub-database in the plurality of sub-databases:

1. Obtain a similarity between each image in the sub-database and the first image.

The similarity between the image and the first image refers to a degree of similarity between the image and the first image, namely, a degree of similarity between an item included in the image and the target item included in the first image. A higher similarity indicates that the image is more similar to the first image, namely, the item included in the image is more similar to the target item.

In certain embodiment(s), the obtaining a similarity includes: performing feature extraction on each image and the first image, to obtain feature vectors of each image and the first image, and calculating the feature vector of each image and the feature vector of the first image to obtain the similarity between each image and the first image. The process of obtaining the similarity between each image and the first image is obtained through calculation by using any similarity algorithm such as a Euclidean distance, a Manhattan distance, or a cosine similarity.

2. Select a plurality of second images from the sub-database according to the similarity between each image and the first image.

The plurality of second images include two or more second images. A similarity between the second image and the first image is higher than a similarity between another image in the sub-database and the first image. After the similarity between each image included in the sub-database and the first image is determined, a plurality of second images having relatively high similarities are selected from the plurality of images included in the sub-database according to the similarity between each image and the first image.

In certain embodiment(s), the selecting a plurality of second images from the sub-database according to the similarity between each image and the first image includes: sorting the plurality of images in the sub-database in descending order of the similarity between each image and the first image, selecting a plurality of images having relatively high similarities from the plurality of images, and using the selected images as the second images. The selecting a plurality of images having relatively high similarities refers to selecting a top certain quantity of images.

In certain embodiment(s), the selecting a plurality of second images from the sub-database according to the similarity between each image and the first image includes: selecting a plurality of images whose similarities with the first image are higher than a reference similarity from the sub-database as second reference images according to the similarity between each image and the first image.

3. Determine an average similarity corresponding to the plurality of second images, and determine the average similarity as a similarity between a category corresponding to the sub-database and the first image.

The average similarity refers to an average value of similarities between the plurality of second images and the first image. The sub-database corresponds to a category, so that the average similarity is used as a similarity between the category corresponding to the sub-database and the first image.

In certain embodiment(s), when the average similarity corresponding to the plurality of second images is determined, a sum of the similarities between the plurality of second images and the first image is determined, and a ratio of the sum to a quantity of the second images is determined as the average similarity.

3042: Determine a category having a highest similarity with the first image in the plurality of categories as the target category.

A higher similarity between the category and the first image indicates that the first image is similar to the category, namely, the target item included in the first image is more likely to belong to the category. Therefore, by selecting a category having the highest similarity with the first image from the plurality of categories as the target category to which the target item belongs, the category to which the target item belongs can be determined.

305: The computing device selects a plurality of reference images belonging to the target category and similar to the first image from the database.

The database includes images belonging to a plurality of categories, so that the computing device can determine images belonging to the target category from the plurality of images stored in the database, and can further select a plurality of images similar to the first image from the images belonging to the target category as reference images.

In certain embodiment(s), the step 305 includes: determining similarities between a plurality of images belonging to the target category in the database and the first image, and selecting a certain quantity of images from the plurality of images as reference images. In certain embodiment(s), the certain quantity is any value preset in the computing device, for example, any value set by a technician or a value set by the device by default such as 5 or 6. In certain embodiment (s), the certain quantity is any value selected by a user, and the certain quantity is not limited in the embodiments of the present disclosure. A similarity between the reference image and the first image is higher than a similarity between another image belonging to the target category and the first image.

In certain embodiment(s), the step 305 includes: determining similarities between a plurality of images belonging to the target category in the database and the first image, and selecting images whose similarities with the first image are greater than a third threshold from the plurality of images as reference images. In certain embodiment(s), the third threshold is any value such as 80%. The third threshold is similar to the certain quantity. In certain embodiment(s), the third threshold is any value preset in the computing device or any value selected by a user.

In addition, the album involved in step 301 is different from the database in this embodiment of the present disclosure. The album is merely used for storing images or videos, the images or videos are photographed by the user by using a computing device or downloaded from the Internet, and the album can be provided for the user to directly view the stored images. The database in this embodiment of the present disclosure is used for storing images and item information corresponding to the images. In certain embodiment(s), the database is obtained by crawling a network by using a crawling tool or is obtained through setting by a technician. The database provides related data in a process of determining the item name of the target item.

In certain embodiment(s), the method provided in the embodiments of the present disclosure is applicable to an Internet application run by a terminal, and the Internet application is an application runs independently on the computing device. In certain embodiment(s), the Internet application is an instant messaging application, an electronic payment application, a map application, or another application. In certain embodiment(s), the Internet application runs a plurality of functional applications, and the functional application is an official account or an applet in the Internet applications. The applet is an application program that can be used without being downloaded and installed. In certain embodiment(s), construction of the database includes that: The Internet application obtains, by crawling information of a plurality of functional applications, a plurality of images and item information corresponding to the plurality of images, and store the plurality of images and the item information corresponding to the plurality of images into the database.

In certain embodiment(s), when the Internet application crawls information from the plurality of functional applications, crawling is performed by using policies such as directional importing, long tail additional crawling, access replaying, or active finding. The directional importing is used for representing a determined a target functional application and crawling information of the target functional application. For example, if a shopping functional application is determined, images in the shopping functional application and corresponding shopping links are crawled. The long tail additional crawling is to crawl, according to item text information included in the item information stored in the database, information corresponding to the item text information. The access replaying refers to determining a plurality of functional applications that are crawled in history, crawling information of the plurality of functional application, and updating the images and the item information corresponding to the images that are stored in the database. The active finding refers to that the Internet application simulates to run a functional application through random control, to crawl information generated during running the functional application.

To ensure the quality of the images included in the database, when the images are stored into the database, duplication filtering may be performed on the images stored in the database, so that the images included in the database are different from each other.

In certain embodiment(s), duplication filtering is performed on the images stored in the database by using a message-digest algorithm 5 (MD5). In certain embodiment(s), duplication filtering is performed on the images stored in the database by using a hash deduplication algorithm. By performing duplication filtering on the images stored in the database by using the hash deduplication algorithm, not only repeated images can be removed, but also images obtained by processing original images can be removed. The processing refers to changing brightness, a size, contrast, edge sharpening, blurring, luminance, or a rotation angle of an original image.

In certain embodiment(s), the hash algorithm is any algorithm such as an average hash (AHash) algorithm, a different hash (DHash) algorithm, or a perceptual hash (PHash) algorithm, to process the images in the database. Repeated images are filtered by adjusting the brightness, size, contrast, edge sharpening, blurring, or luminance of the images.

In the DHash algorithm, deduplication processing may only be performed by calculating a brightness difference between adjacent pixels. This processing manner is relatively simple, and the DHash algorithm has a relatively good tolerance for simple processing operations on pictures and has a relatively good anti-interference capability for small changes of the brightness, size, contrast, edge sharpening, blurring, or luminance of the images, thereby helping reduce more invalid images. For example, performing duplication filtering on the database by using the DHash algorithm can remove about 30% repeated images.

306: The computing device performs word segmentation on item text information corresponding to the plurality of reference images to obtain a plurality of words.

In the embodiments of the present disclosure, the database further includes item information corresponding to each image, and the item information includes at least item text information. After the plurality of reference images are determined, item information corresponding to the plurality of reference images can be obtained, and item text information corresponding to the plurality of reference images are obtained.

In certain embodiment(s), the item text information is title information and brief introduction information corresponding to the item included in the image and used for describing the item. The item text information includes a plurality of characters, and word segmentation is to divide the plurality of characters included in the item text information into a plurality of words.

In certain embodiment(s), the plurality of words include a same word. In certain embodiment(s), the plurality of words do not include a same word. The item text information corresponding to the plurality of reference images may include a same word, so that after word segmentation is performed on the item text information corresponding to the plurality of reference images, the obtained plurality of words may include the same word. However, to enable the obtained plurality of words not to include the same word, duplication filtering may be performed on the obtained words, to reserve only one of the repeated words, so that the plurality of words after duplication filtering are different from each other.

In certain embodiment(s), the step 306 includes: performing word segmentation on the item text information corresponding to the plurality of reference images according to a plurality of reference lengths, to obtain a word whose length is equal to each reference length separately.

The reference length is used for representing a quantity of characters included in a word. For example, if the reference length is 3, a word corresponding to the reference length includes 3 characters.

By performing word segmentation on the item text information corresponding to the plurality of reference images according to any reference length in the plurality of reference lengths, a word whose length is equal to the reference length can be obtained, and word segmentation is then performed on the item text information corresponding to the plurality of reference images according to other reference lengths, to obtain a word whose length is equal to each reference length separately.

Figure 5:
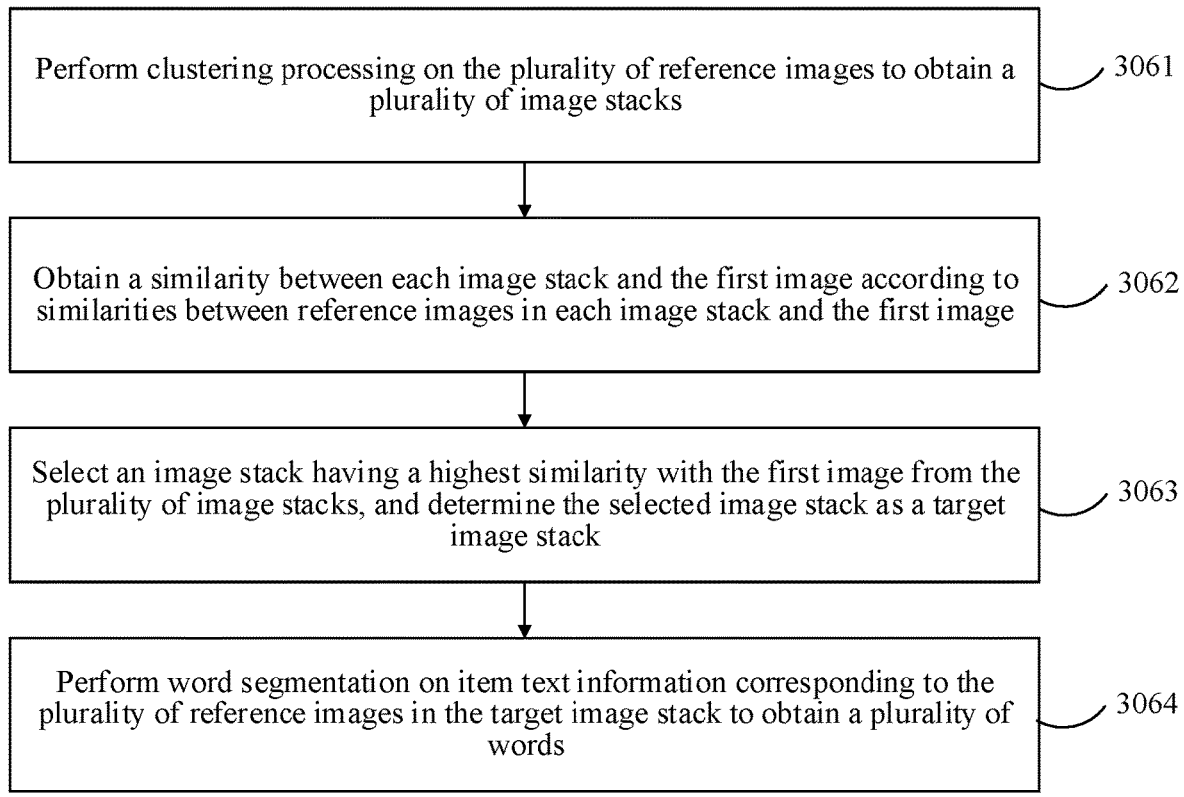
FIG. 5 is a schematic flowchart of a method for determining an item name according to embodiment(s) of the present disclosure.

In certain embodiment(s), as shown in FIG. 5, the step 306 may include the following steps 3061 to 3064:

3061: Perform clustering processing on the plurality of reference images to obtain a plurality of image stacks.

Each image stack includes at least two reference images. Clustering processing is performed on the plurality of reference images, to filter reference images that cannot form an image stack in the plurality of reference images, to obtain a plurality of image stacks, thereby avoiding influence of noise images in the plurality of reference images and improving the accuracy of subsequently obtained words. Clustering processing may be performed by using a density-based spatial clustering of applications with noise (DB-SCAN) algorithm, to obtain a plurality of image stacks.

In certain embodiment(s), the step 3061 includes: establishing, in response to that a similarity between any two reference images in the plurality of reference images is greater than a second threshold, an association relationship between any two reference images, and forming reference images having an association relationship in the plurality of reference images into an image stack, to obtain a plurality of image stacks. The second threshold may be a value arbitrarily set, for example, 80% or 90%.

In the plurality of reference images, every two reference images have a similarity, and if the similarity between any two reference images is greater than the second threshold, it indicates that a degree of similarity between the any two reference images meets certain requirements, and an association relationship is established between the any two reference images to form the reference images having an association relationship into an image stack.

For example, the plurality of reference images include a reference image 1, a reference image 2, a reference image 3, a reference image 4, and a reference image 5. The reference image 1 and the reference image 2 have an association relationship, the reference image 2 and the reference image 3 have an association relationship, the reference image 3 and the reference image 4 have an association relationship, and the reference image 4 and the reference image 5 have an association relationship, so that the reference image 1, the reference image 2, the reference image 3, the reference image 4, and the reference image 5 form an image stack.

3062: Obtain a similarity between each image stack and the first image according to similarities between reference images in each image stack and the first image.

Each image stack includes at least two reference images, and each reference image has a similarity with the first image, so that the image stack formed by at least two reference images also has a similarity with the first image.

In certain embodiment(s), the obtaining a similarity between each image stack and the first image includes: determining an average value of similarities between a plurality of reference images in the image stack and the first image, and using the average value as the similarity between the image stack and the first image. The average value is a ratio of a sum of the similarities between the plurality of reference images in the image stack and the first image to a quantity of the reference images in the image stack.

3063: Select an image stack having a highest similarity with the first image from the plurality of image stacks, and determine the selected image stack as a target image stack.

In the plurality of image stacks, a higher similarity between an image stack and the first image indicates that reference images in the image stack are more similar to the first image, that is, items included in the reference images are more similar to the target item. Therefore, an image stack having the highest similarity with the first image is selected from the plurality of image stacks, and the selected image stack is used as a target image stack.

3064: Perform word segmentation on item text information corresponding to the plurality of reference images in the target image stack to obtain a plurality of words.

The step 3064 is similar to the process of obtaining a plurality of words in step 306, and details are not described herein again.

307: The computing device extracts a key word meeting a reference condition from the plurality of words, and determines the extracted key word as an item name of the target item.

The reference condition is a condition met by the item name included in the item text information, and the key word meeting the reference condition is a word that can reflect meanings described by the plurality of words, so that using the determined key word as the item name of the target item can describe the target item.

In certain embodiment(s), determining that a word meets the reference condition includes: determining an average value of word vectors of the plurality of words as a center vector, determining a distance between each word vector in the word vectors and the center vector, and determining a word corresponding to a word vector having a smallest distance as the key word meeting the reference condition.

In certain embodiment(s), each word is represented by using a word vector, and word vectors of different words are different from each other. A smaller distance between word vectors indicates that the two word vectors are more similar to each other. In certain embodiment(s), the distance between word vectors is calculated by using any distance algorithm such as the Euclidean distance, the Manhattan distance, or the cosine similarity.

The plurality of words are obtained by performing word segmentation on the item text information, so that the plurality of words are words used for describing items in the reference images. The reference images have a relatively high similarity with the first image, so that the items in the reference images have a relatively high similarity with the target item or the items in the reference images are the target item. However, in addition to words used for describing the target item, the plurality of words may include a few interference words and words describing other items. Therefore, to filter out words describing the target item from the plurality of words, a center vector corresponding to the plurality of words may be further determined according to the word vectors of the plurality of words, and a word whose word vector is closer to the center vector indicates that the word describes the target item more accurately. Therefore, a word vector having a smallest distance to the center vector is selected from the plurality of word vectors, and a word corresponding to the word vector is determined as the key word meeting the reference condition.

In certain embodiment(s), appearance frequency of the plurality of words in the item text information corresponding to the plurality of reference images is determined, a word having a largest length and whose appearance frequency is higher than a first threshold is selected from the plurality of words, and the selected word is determined as the key word meeting the reference condition; or a word having the highest appearance frequency is selected from the plurality of words, and the selected word is determined as the key word meeting the reference condition.

The appearance frequency is used for representing a proportion of a quantity of appearance times of a word in the item text information corresponding to the plurality of reference images. The first threshold may be a value arbitrarily set. For example, generally, a minimum value of appearance frequency of an item name in corresponding item text information may be used as the first threshold.

The item text information is used for describing the target item, so that a quantity of appearance times of the item name of the target item is generally higher than those of other words. In this way, a key word having relatively high appearance frequency may be determined according to the appearance frequency of the plurality of words, and the key word is used as the item name of the target item. In certain embodiment(s), when the key word is determined, a word having the highest appearance frequency in the plurality of words is directly determined as the key word. However, meanings represented by words having different lengths may be the same, but a word having a greater length includes more information such as "exhibition" and "xx city exhibition". Therefore, to improve the accuracy of the determined key word, a word whose appearance frequency is higher than the first threshold and having the largest length is selected from the plurality of words, and the selected word is determined as the key word.

In certain embodiment(s), the determined plurality of words are obtained by performing word segmentation on the item text information corresponding to the plurality of reference images according to a plurality of reference lengths, so that the plurality of words include a word whose length is equal to each reference length. When the key word is determined, the appearance frequency of the plurality of words in the item text information corresponding to the plurality of reference images is determined, a word having a largest length and whose appearance frequency is higher than the first threshold is selected from the plurality of words, and the selected word is determined as the key word meeting the reference condition; or a word having the highest appearance frequency is selected from the plurality of words, and the selected word is determined as the key word meeting the reference condition.

In certain embodiment(s), determining appearance frequency of a word includes: for any word, traversing a plurality of pieces of item text information according to the word, determining a quantity of pieces of item text information including the word, and determining a ratio of the quantity to a total quantity of the plurality of pieces of item text information as the appearance frequency of the word.

In certain embodiment(s), determining appearance frequency of a word includes: for any word, traversing a plurality of pieces of item text information according to the word, determining a quantity of appearance times of the word in the plurality of pieces of item text information, and determining a ratio of the quantity of appearance times to a total quantity of plurality of pieces of item text information as the appearance frequency of the word.

308: The computing device performs searching according to the item name, to obtain item information corresponding to the item name.

Searching is performed according to the item name of the target item, so that the obtained item information is more accurate, and the user can know the target item according to the item information. For example, searching is performed for an item name "coffee cup", and obtained item information includes a plurality of pieces of information of the "coffee cup" and brief introduce information of the "coffee cup".

In certain embodiment(s), the method provided in the embodiments of the present disclosure is applicable to an item recognition client, and the item recognition client has a search function. In certain embodiment(s), a search process includes: performing searching for the item name by using the search function of the item recognition client, to obtain item information corresponding to the item name.

In certain embodiment(s), the method provided in the embodiments of the present disclosure is applicable to an item recognition client, and the item recognition client does not have a search function. In certain embodiment(s), a search process includes: invoking, by using an interface provided by a search application client by the item recognition client, the search application client to perform searching for the item name, to obtain item information corresponding to the item name.

309: The computing device displays the item information in a current display interface.

The item information obtained through searching is displayed in the display interface, so that the user can view the item information through the display interface to know the target item.

In certain embodiment(s), the method further includes: selecting a reference image having a highest quality score from the plurality of reference images, using the selected reference image as a presentation image of the target item, and displaying the presentation image in the display interface.

The quality score is used for representing quality of an item displayed in the reference image. A higher quality score indicates that the item displayed in the reference image is clearer, the reference image includes fewer other content, and the user can view the item included in the reference image clearly; and A lower quality score indicates that the item displayed in the reference image is blurrier, the reference image includes more other content, and the user cannot view the item included in the reference image clearly.

The quality score of each reference image is determined, a reference image having the highest quality score is selected, and the selected reference image is displayed in the display interface as a presentation image, so that the user can view the presentation image through the display interface.

In certain embodiment(s), determining a quality score of a reference image includes: determining a background score and a text score of the reference image, and determining a difference between the background score and the text score of the reference image as the quality score of the reference image.

The background score is used for representing content included in other regions other than the region in which the item is located in the reference image, where more content included in other regions indicates a lower background score; and fewer content included in other regions indicates a higher background score. For example, if the highest background score is 1, when other regions other than the region in which the item is located in the reference image are white background, the background score of the reference image is 1.

The text score is used for representing text included in other regions other than the region in which the item is located in the reference image, where more text indicates a higher text score of the reference image, and fewer text indicates a lower text score of the reference image.

In certain embodiment(s), the method further includes: displaying item information corresponding to the plurality of reference images in the display interface.

By displaying the item information corresponding to the plurality of reference images in the display interface, content included in the display interface is enriched, so that the user can view the item information of the plurality of reference images and know the target item more accurately.

Currently, two-dimensional code has been well spread. For example, when the user reaches a tourist attraction, and the user is interested in historical information of the tourist attraction, item information corresponding to the tourist attraction can be viewed by scanning two-dimensional code of the tourist attraction. Both graphic code in various form and text information may be considered as an image in a specific encoding form, and scan for item recognition is to recognize a natural scenario image. The scan for item recognition essentially is a search engine, and a difference lies in that an input manner upgrades from two-dimensional code to any obtained image. Not all items have two-dimensional code, and the user can use a camera to photograph any item to further obtain item information of the item by photographing the item, so that information behind the item can be known conveniently by using the method provided in the embodiments of the present disclosure.

When the user is interested in an unknown item, the user may first know information of the item, including a brand, use, a price, and other parameters. The user may then view comments of other users on the item, and browses evaluation articles and use feedback of other users. Finally, the user may purchase the item and compare prices in different shopping applications. According to the method provided in the embodiments of the present disclosure, provided that an interested item is photographed by using a camera, encyclopedic information of the item may be obtained, and evaluation articles and questions and answers of netizens may be also known, and price comparison may be performed in applets and the item is finally purchased. The scan for item recognition performs a link loop of item searching and distributes official account articles and applets in a decentralized manner. In this way, a use scenario of the user is met and development of content included in an application is prompted.

Figure 6:
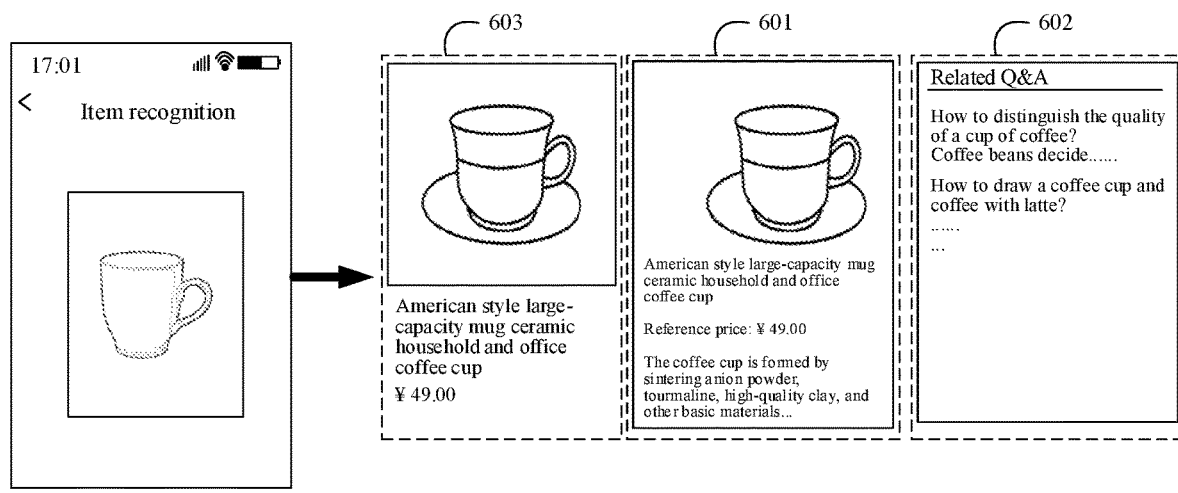
FIG. 6 is a schematic diagram of displaying item information according to embodiment(s) of the present disclosure.
Figure 7:
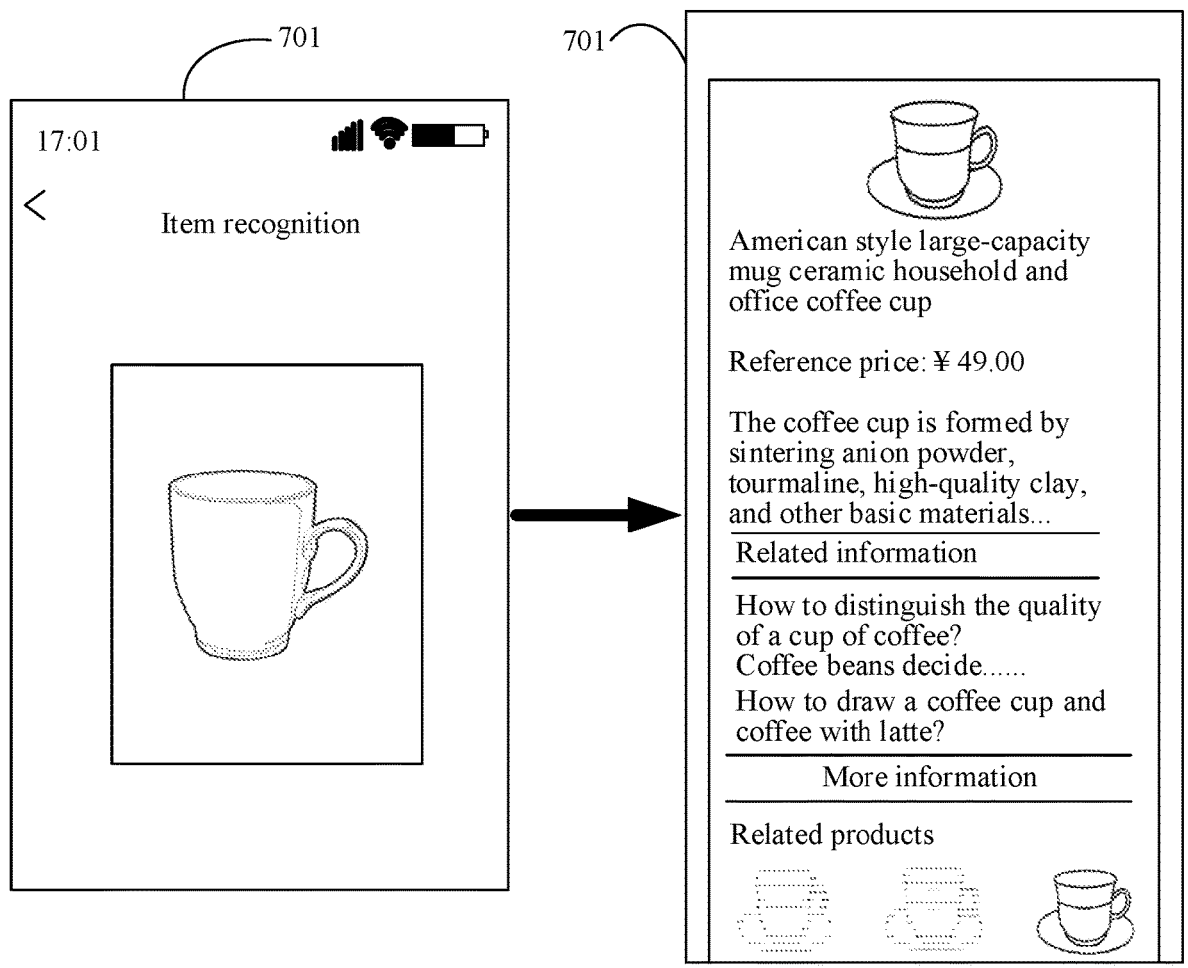
FIG. 7 is a schematic diagram of displaying item information according to embodiment(s) of the present disclosure.
Figure 8:
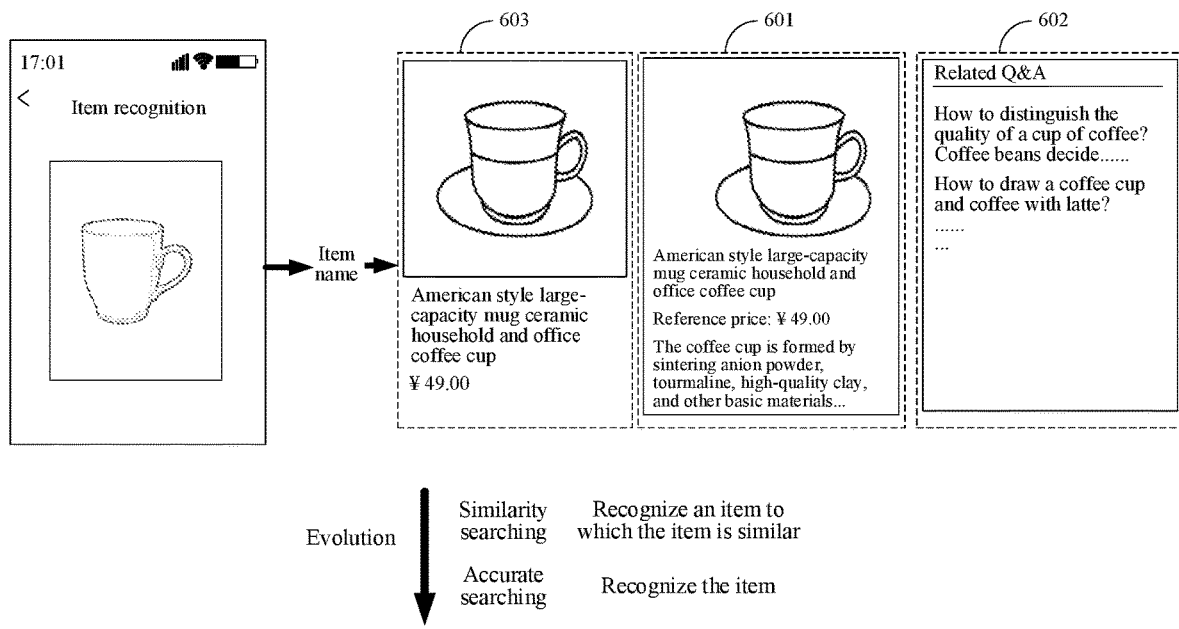
FIG. 8 is a schematic flowchart of a method for determining an item name according to embodiment(s) of the present disclosure.

As shown in FIG. 6, the user photographs a cup by using a terminal to recognize an obtained image including the cup, determines a cup name, performs searching according to the cup name to obtain encyclopedic information 601 and information information 602 corresponding to the cup name, further obtains a shopping link 603 of a reference image similar to the image in a database, and displays the obtained shopping link 603, the encyclopedic information 601, and the information information 602 in a display interface of the terminal. As shown in FIG. 7, obtained information of the cup is displayed in the display interface 701 according to a display style in FIG. 7. As shown in FIG. 8, the item is recognized by using the method provided in the embodiments of the present disclosure, the item name of the item is first determined, and the encyclopedic information 601, the information information 602, and the shopping link 603 are then obtained according to the item name. In certain existing technologies, similarity searching is performed on the image to determine other items similar to the item. Compared with certain existing technologies, the method provided in the embodiments of the present disclosure implements more accurate searching, and the accuracy of item recognition is improved by recognizing the item name of the item.

According to the method provided in the embodiments of the present disclosure, the plurality of reference images are images similar to the first image, so that items in the plurality of reference images are similar to the target item in the first image, and the target item can be also described by the item text information of the reference images. By obtaining the item text information of the plurality of reference images, the accuracy of the obtained item text information is improved, and a key word meeting the reference condition is extracted from the obtained item text information, so that the accuracy of the obtained key word is improved, thereby improving the accuracy of the determined item name.

Searching is performed according to the determined item name, so that a process of searching the item information is more targeted, thereby improving the accuracy of the obtained item information.

By displaying the item information corresponding to the item name, the presentation image, and the item information corresponding to the plurality of reference images in the display interface, content included in the display interface is enriched and the attractiveness for the user is improved.

Figure 9:
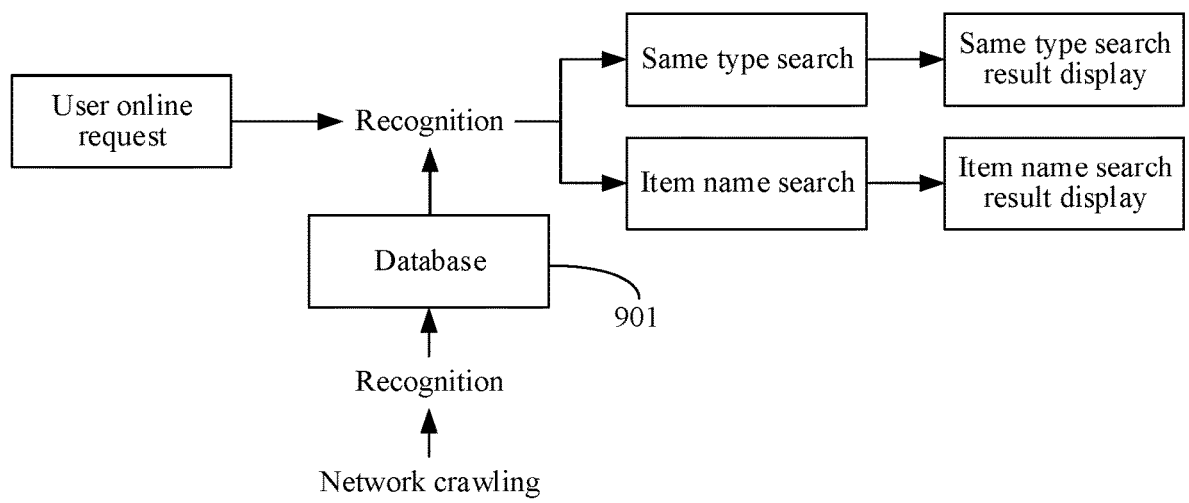
FIG. 9 is a schematic flowchart of a method for determining an item name according to embodiment(s) of the present disclosure.

FIG. 9 is a flowchart of a method for determining an item name according to an embodiment of the present disclosure. As shown in FIG. 9, an image and corresponding item information are obtained by crawling a network by using a crawling tool, the image is recognized to determine a category to which an item included in the image belongs, and the image and the corresponding item information are correspondingly stored with the category to which the item included in the image belongs into a database 901. A user online request is obtained, where the user online request carries a first image including a target item. The first image is recognized, a plurality of reference images similar to the first image are selected from the database 901, items included in the plurality of reference images are used as similar items of the target item, the plurality of reference images and corresponding item information are used as the same type of search results, and an item name of the target item is determined according to the item information of the plurality of reference images. Searching is performed by using the item name of the target item, to obtain an item name search result. In certain embodiment(s), the item name search result comes from a plurality of data sources such as Wikipedia websites or information websites, and the same type of search results and the item name search result are displayed, so that the user can view the displayed information and know the target item.

In addition, in the method provided in the embodiments of the present disclosure, the first image including the target item is recognized by using a trained network model, and the plurality of reference images are selected from the database or the item information of the plurality of reference images is processed by using the trained network model, to obtain the item name of the item.

Figure 10:
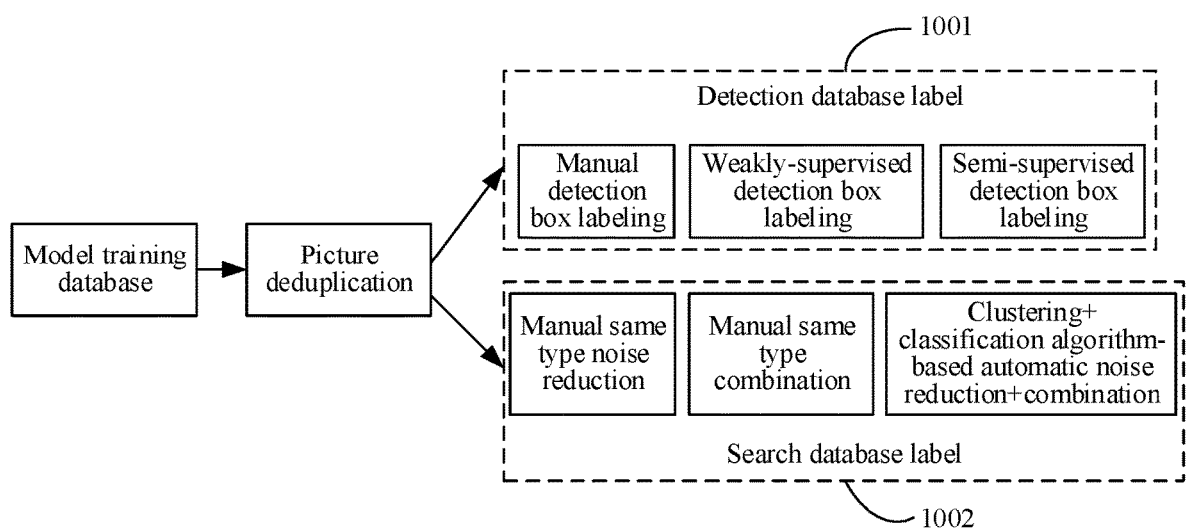
FIG. 10 is a schematic flowchart of setting a model training database according to embodiment(s) of the present disclosure.

FIG. 10 shows a process of training a network model by using images included in a model training database to obtain the trained network model. A model training database is set, a plurality of sample images are obtained, deduplication processing is performed on the plurality of sample images, the plurality of sample images after the deduplication processing are labeled, and the labeled sample images are stored into the model training database.

When the plurality of sample images after the deduplication processing are labeled, labels of a sample image include a detection database label 1001 and a search database label 1002.

The detection database label 1001 is used for labeling items included in the sample image by using a detection box. In certain embodiment(s), any labeling method such as manual detection box labeling, weakly-supervised detection labeling, or semi-supervised detection box labeling is used. The manual detection box labeling is to manually use detection boxes to label a plurality of items included in each sample image; the weakly-supervised detection box labeling is to manually use detection boxes to label main items included in each sample image; and the semi-supervised detection box labeling is to label each sample image by using an initial network model to obtain labeling results of the plurality of sample images, and manually calibrate the labeling results of the plurality of sample images.

The search database label 1002 is used for performing noise reduction on or combining sample images including the same item. In certain embodiment(s), this process uses any noise reduction or combination method such as manual same type noise reduction, manual same type combination, or automatic noise reduction and combination using clustering and classification algorithms. The manual same type noise reduction refers to select a sample image from a plurality of sample images including the same item according to items included in each sample image, so that any two sample images in the selected plurality of sample images include different items. The manual same type combination refers to combine a plurality of sample images including the same item according to items included in each sample image to obtain a plurality of sample image sets corresponding to the items, and different sample image sets correspond to different items. The automatic noise reduction and combination using clustering and classification algorithms refers to combine sample images including the same item by using a clustering algorithm and a classification algorithm to obtain a plurality of sample image sets, and select a sample image from each sample image set, so that any two sample images in the selected plurality of sample images include different items.

Figure 11:
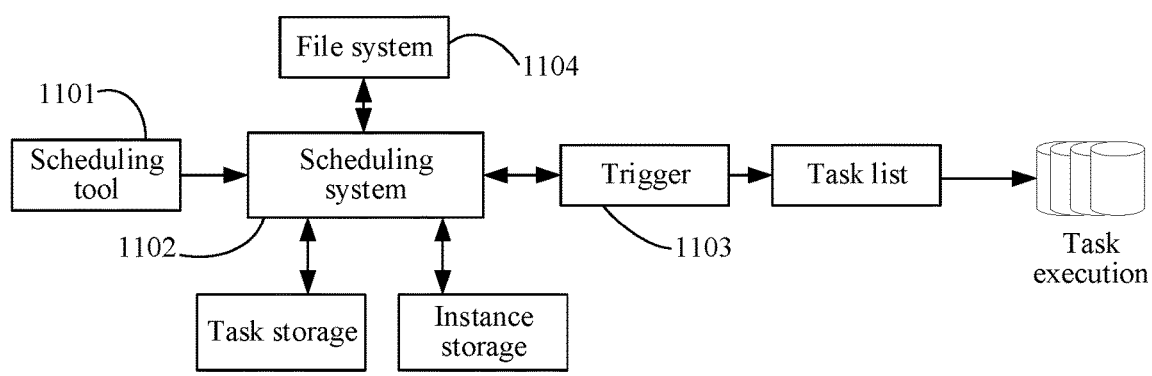
FIG. 11 is a schematic structural diagram of a task scheduling platform according to embodiment(s) of the present disclosure.

In addition, in the method provided in the embodiments of the present disclosure, the entire process of determining the item name may be implemented by using a scheduling function of a task scheduling platform, to provide the searched item information for the user. As shown in FIG. 11, the task scheduling platform includes a scheduling tool 1101, a scheduling system 1102, a trigger 1103, and a file system 1104. The file system 1104 may include a Hadoop distributed file system (HDFS) and a workflow system (WFS). After the task scheduling platform receives an item search task, the scheduling system 1102 stores the received item search task by using the scheduling tool 1101, where stored task information includes a task name and a scheduling time, queries executable item search tasks by using the trigger 1103, obtains an item search task that may be executed from a task list, and performs the item search task, to obtain information corresponding to an item in an image. An instance storage can store the plurality of images and the item information corresponding to the images in the embodiments of the present disclosure. The scheduling system 1101 may further schedule the instance storage and invoke information in the instance storage when executing an item recognition task. In certain embodiment(s), when new information is crawled by using the crawling tool, the scheduling system 1101 can further update the information in the instance storage.

Figure 12:
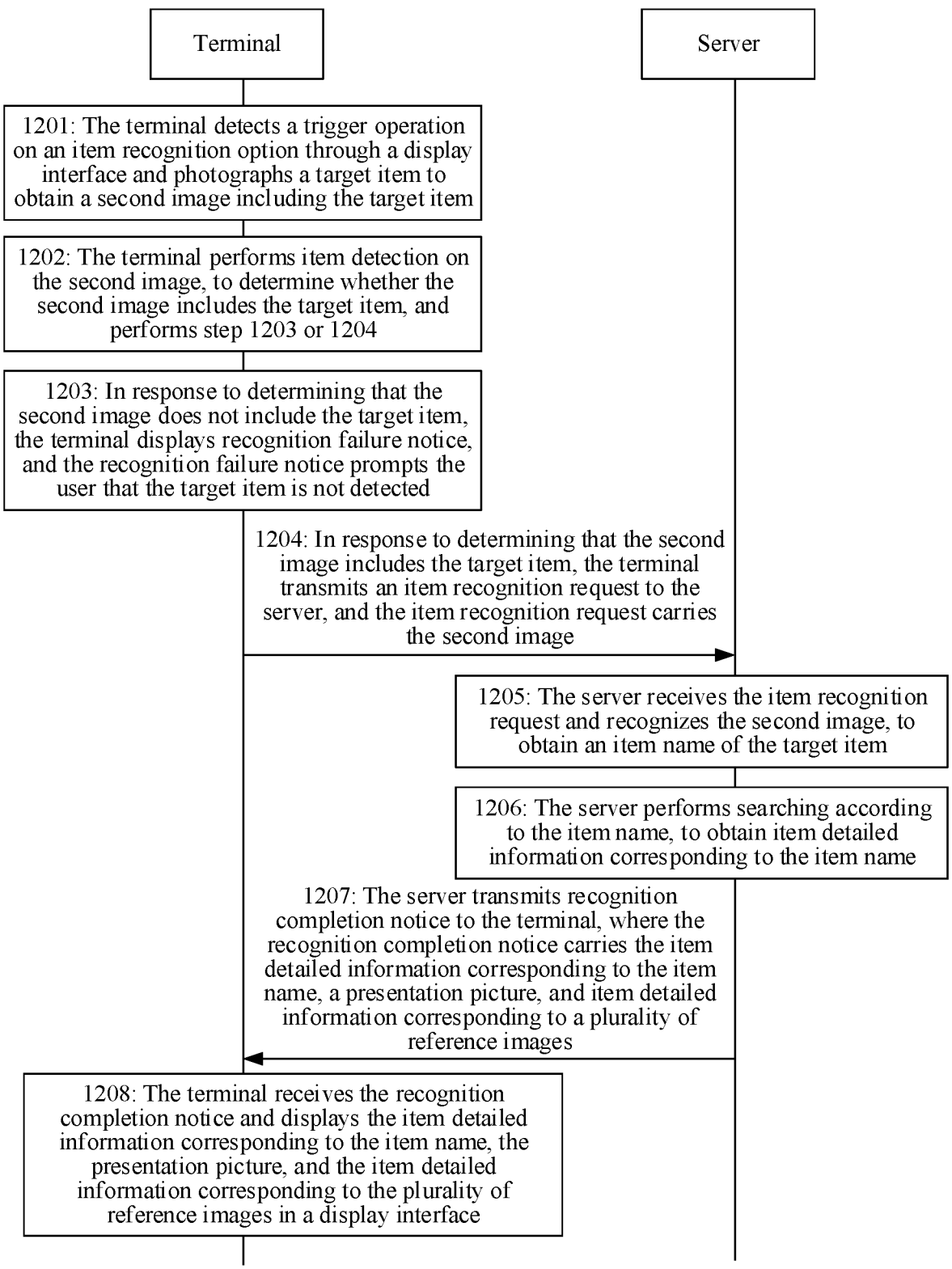
FIG. 12 is a schematic flowchart of a method for determining an item name according to embodiment(s) of the present disclosure.

FIG. 12 is a flowchart of a method for determining an item name according to an embodiment of the present disclosure, and interaction entities are a terminal and a server. As shown in FIG. 12, the method includes:

1201: The terminal detects a trigger operation on an item recognition option through a display interface and photographs a target item to obtain an original image including the target item.

1202: The terminal performs item detection on the original image, to determine whether the original image includes the target item, and performs step 1203 or 1204.

1203: In response to determining that the original image does not include the target item, the terminal displays recognition failure notice, and the recognition failure notice prompts the user that the target item is not detected.

1204: In response to determining that the original image includes the target item, the terminal transmits an item recognition request to the server, and the item recognition request carries the original image.

1205: The server receives the item recognition request and recognizes the original image, to obtain an item name of the target item.

The step 1205 is similar to the process of determining the target item in the embodiment shown in FIG. 3, and details are not described herein again.

1206: The server performs searching according to the item name, to obtain item information corresponding to the item name.

1207: The server transmits recognition completion notice to the terminal, where the recognition completion notice carries the item information corresponding to the item name, a display picture, and item information corresponding to a plurality of reference images.

1208: The terminal receives the recognition completion notice and displays the item information corresponding to the item name, the display picture, and the item information corresponding to the plurality of reference images in a display interface.

Figure 13:
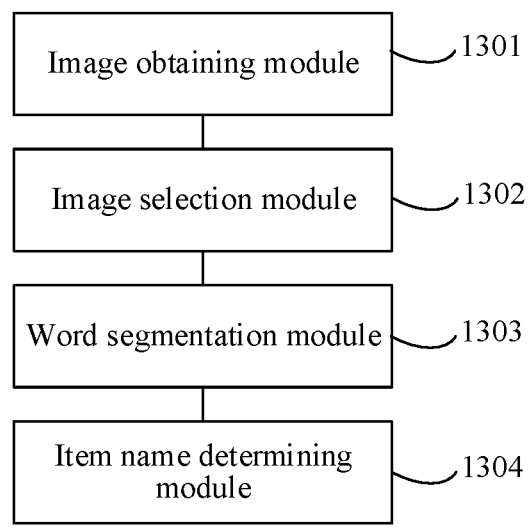
FIG. 13 is a schematic structural diagram of an apparatus for determining an item name according to embodiment(s) of the present disclosure.

FIG. 13 is a schematic structural diagram of an apparatus for determining an item name according to an embodiment of the present disclosure. As shown in FIG. 13, the apparatus includes: an image obtaining module 1301, configured to obtain a first image including a target item; an image selection module 1302, configured to select a plurality of reference images similar to the first image from a database, the database including a plurality of images and item information corresponding to the plurality of images, the item information corresponding to the images being used for describing items included in the images, and the item information corresponding to the images including at least item text information; a word segmentation module, 1303 configured to perform word segmentation on item text information corresponding to the plurality of reference images to obtain a plurality of words; and an item name determining module 1304, configured to extract a key word meeting a reference condition from the plurality of words, and determine the extracted key word as an item name of the target item.

Figure 14:
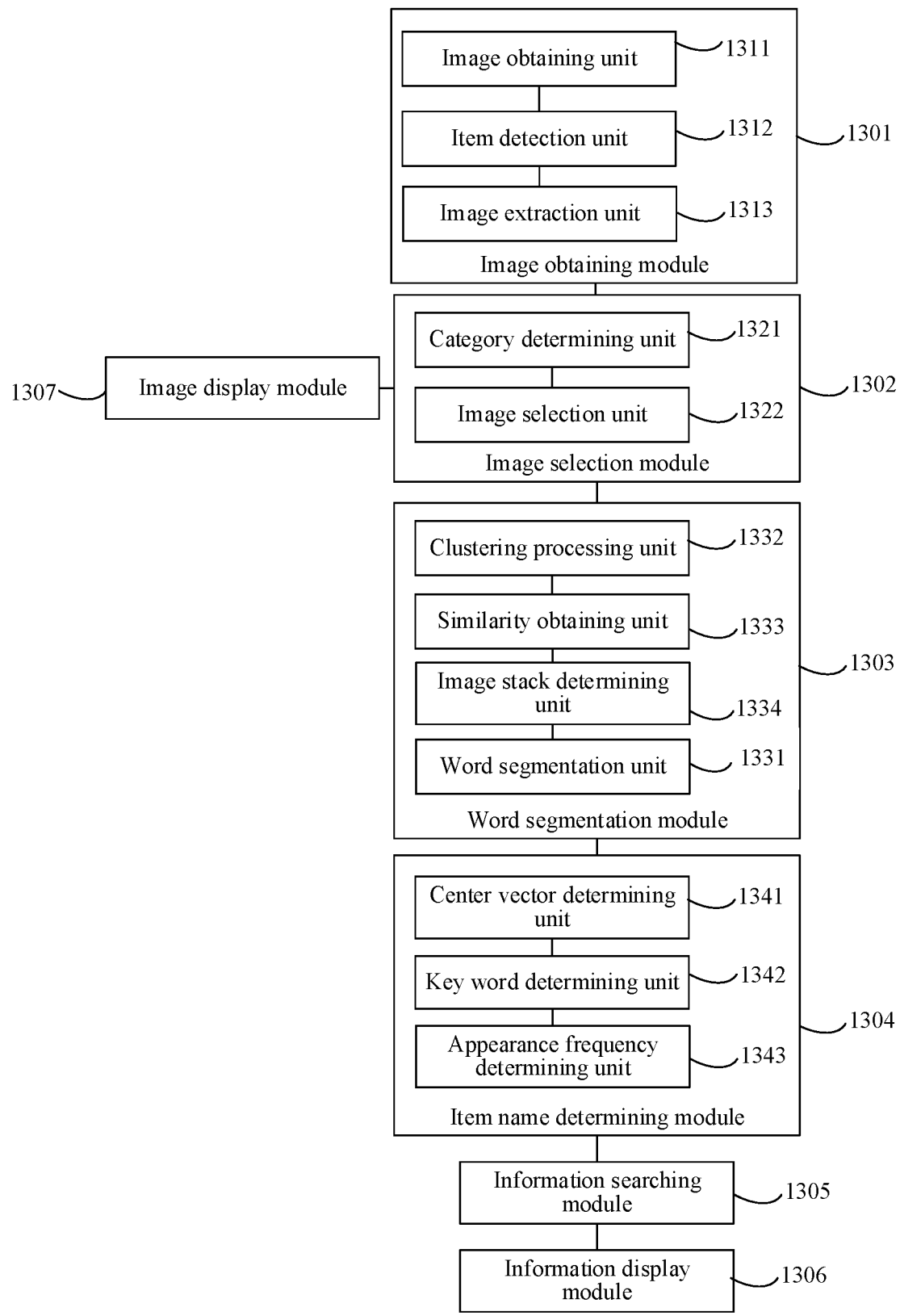
FIG. 14 is a schematic structural diagram of an apparatus for determining an item name according to embodiment(s) of the present disclosure.

In certain embodiment(s), as shown in FIG. 14, the item name determining module 1304 includes: a center vector determining unit 1341, configured to determine an average value of word vectors of the plurality of words as a center vector; and a key word determining unit 1342, configured to determine a distance between each word vector in the word vectors and the center vector, and determine a word corresponding to a word vector having a smallest distance as the key word meeting the reference condition.

In certain embodiment(s), as shown in FIG. 14, the word segmentation module 1303 includes: a word segmentation unit 1331, configured to perform word segmentation on the item text information corresponding to the plurality of reference images according to a plurality of reference lengths, to obtain a word whose length is equal to each reference length separately.

In certain embodiment(s), as shown in FIG. 14, the item name determining module 1304 includes: an appearance frequency determining unit 1343, configured to determine appearance frequency of the plurality of words in the item text information corresponding to the plurality of reference images; and a key word determining unit 1342, configured to select, from the plurality of words, a word having a largest length and whose appearance frequency is higher than a first threshold, and determine the selected word as the key word meeting the reference condition; or the key word determining unit 1342 being configured to select, from the plurality of words, a word having the highest appearance frequency, and determine the selected word as the key word meeting the reference condition.

In certain embodiment(s), as shown in FIG. 14, the image obtaining module 1301 includes: an image obtaining unit 1311, configured to obtain an original image including the target item; an item detection unit 1312, configured to perform item detection on the original image to determine a region in which the target item is located in the original image; and an image extraction unit 1313, configured to extract an image of the region from the original image to obtain the first image.

In certain embodiment(s), as shown in FIG. 14, the database includes images belonging to a plurality of categories; and the image selection module 1302 includes: a category determining unit 1321, configured to determine a target category to which the first image belongs; and an image selection unit 1322, configured to select a plurality of reference images belonging to the target category and similar to the first image from the database.

In certain embodiment(s), the category determining unit 1321 is further configured to obtain a similarity between each category in the plurality of categories and the first image separately; and determine a category having a highest similarity with the first image in the plurality of categories as the target category.

In certain embodiment(s), the database includes a plurality of sub-databases, different sub-databases correspond to different categories, and each sub-database includes at least one image belonging to a corresponding category and item information corresponding to the at least one image; and the category determining unit 1321 is further configured to perform the following operations for each sub-database in the plurality of sub-databases: obtaining a similarity between each image in the sub-database and the first image; selecting a plurality of second images from the sub-database according to the similarity between each image and the first image, a similarity between the second image and the first image being higher than a similarity between another image in the sub-database and the first image; and determining an average similarity corresponding to the plurality of second images, and determining the average similarity as a similarity between a category corresponding to the sub-database and the first image.

In certain embodiment(s), as shown in FIG. 14, the word segmentation module 1303 includes: a clustering processing unit 1332, configured to perform clustering processing on the plurality of reference images to obtain a plurality of image stacks, each image stack including at least two reference images; a similarity obtaining unit 1333, configured to obtain a similarity between each image stack and the first image according to similarities between reference images in each image stack and the first image; an image stack determining unit 1334, configured to select an image stack having a highest similarity with the first image from the plurality of image stacks, and determine the selected image stack as a target image stack; and a word segmentation unit 1331, configured to perform word segmentation on item text information corresponding to the plurality of reference images in the target image stack to obtain a plurality of words.

In certain embodiment(s), the clustering processing unit 1332 is further configured to establish an association relationship between any two reference images in response to that a similarity between any two reference images in the plurality of reference images is higher than a second threshold; and form reference images having an association relationship in the plurality of reference images into an image stack, to obtain the plurality of image stacks.

In certain embodiment(s), as shown in FIG. 14, after the extracting a key word meeting a preset condition from the plurality of words, and determining the extracted key word as an item name of the target item, the apparatus further includes: an information searching module 1305, configured to perform searching according to the item name, to obtain item information corresponding to the item name; and an information display module 1306, configured to display the item information in a current display interface.

In certain embodiment(s), as shown in FIG. 14, the apparatus further includes: the image selection module 1302 being configured to select a reference image having a highest quality score from the plurality of reference images, and use the selected reference image as a presentation image of the target item; and an image display module 1307, configured to display the presentation image in the display interface.

In certain embodiment(s), as shown in FIG. 14, the apparatus further includes: the information display module 1306 being further configured to display the item information corresponding to the plurality of reference images in the display interface.

In certain embodiment(s), as shown in FIG. 14, the image obtaining module 1301 includes: an image obtaining unit 1311, configured to obtain the first image including the target item in response to that a trigger operation on an item recognition option is detected through the display interface.

The computing device provided in the technical solution may be implemented as a terminal or a server. For example, the computing device includes one or more processors and one or more memories, the one or more memories storing at least one piece of program code, and the at least one piece of program code being loaded by the one or more processors to implement the following operations: obtaining a first image including a target item; selecting a plurality of reference images similar to the first image from a database, the database including a plurality of images and item information corresponding to the plurality of images, the item information corresponding to the images being used for describing items included in the images, and the item information corresponding to the images including at least item text information; performing word segmentation on item text information corresponding to the plurality of reference images to obtain a plurality of words; and extracting a key word meeting a reference condition from the plurality of words, and determining the extracted key word as an item name of the target item.

In certain embodiment(s), the at least one piece of program code is loaded by the one or more processors to implement the following operations: determining an average value of word vectors of the plurality of words as a center vector; and determining a distance between each word vector in the word vectors and the center vector, and determining a word corresponding to a word vector having a smallest distance as the key word meeting the reference condition.

In certain embodiment(s), the at least one piece of program code is loaded by the one or more processors to implement the following operations: performing word segmentation on the item text information corresponding to the plurality of reference images according to a plurality of reference lengths, to obtain a word whose length is equal to each reference length separately.

In certain embodiment(s), the at least one piece of program code is loaded by the one or more processors to implement the following operations: determining appearance frequency of the plurality of words in the item text information corresponding to the plurality of reference images; and selecting, from the plurality of words, a word having a largest length and whose appearance frequency is higher than a first threshold, and determining the selected word as the key word meeting the reference condition; or selecting, from the plurality of words, a word having the highest appearance frequency, and determining the selected word as the key word meeting the reference condition.

In certain embodiment(s), the at least one piece of program code is loaded by the one or more processors to implement the following operations: obtaining an original image including the target item; performing item detection on the original image to determine a region in which the target item is located in the original image; and extracting an image of the region from the original image to obtain the first image.

In certain embodiment(s), the database includes images belonging to a plurality of categories; and the at least one piece of program code is loaded by the one or more processors to implement the following operations: determining a target category to which the first image belongs; and selecting a plurality of reference images belonging to the target category and similar to the first image from the database.

In certain embodiment(s), the at least one piece of program code is loaded by the one or more processors to implement the following operations: obtaining a similarity between each category in the plurality of categories and the first image separately; and determining a category having a highest similarity with the first image in the plurality of categories as the target category.

In certain embodiment(s), the database includes a plurality of sub-databases, different sub-databases correspond to different categories, and each sub-database includes at least one image belonging to a corresponding category and item information corresponding to the at least one image; and the at least one piece of program code is loaded by the one or more processors to implement the following operations: performing the following operations for each sub-database in the plurality of sub-databases: obtaining a similarity between each image in the sub-database and the first image; selecting a plurality of second images from the sub-database according to the similarity between each image and the first image, a similarity between the second image and the first image being higher than a similarity between another image in the sub-database and the first image; and determining an average similarity corresponding to the plurality of second images, and determining the average similarity as a similarity between a category corresponding to the sub-database and the first image.

In certain embodiment(s), the at least one piece of program code is loaded by the one or more processors to implement the following operations: performing clustering processing on the plurality of reference images to obtain a plurality of image stacks, each image stack including at least two reference images; obtaining a similarity between each image stack and the first image according to similarities between reference images in each image stack and the first image; selecting an image stack having a highest similarity with the first image from the plurality of image stacks, and determining the selected image stack as a target image stack; and performing word segmentation on item text information corresponding to the plurality of reference images in the target image stack to obtain a plurality of words.

In certain embodiment(s), the at least one piece of program code is loaded by the one or more processors to implement the following operations: establishing an association relationship between any two reference images in response to that a similarity between any two reference images in the plurality of reference images is higher than a second threshold; and forming reference images having an association relationship in the plurality of reference images into an image stack, to obtain the plurality of image stacks.

In certain embodiment(s), the at least one piece of program code is loaded by the one or more processors to implement the following operations: performing searching according to the item name, to obtain item information corresponding to the item name; and displaying the item information in a current display interface.

In certain embodiment(s), the at least one piece of program code is loaded by the one or more processors to implement the following operations: selecting a reference image having a highest quality score from the plurality of reference images, and using the selected reference image as a presentation image of the target item; and displaying the presentation image in the display interface.

Figure 15:
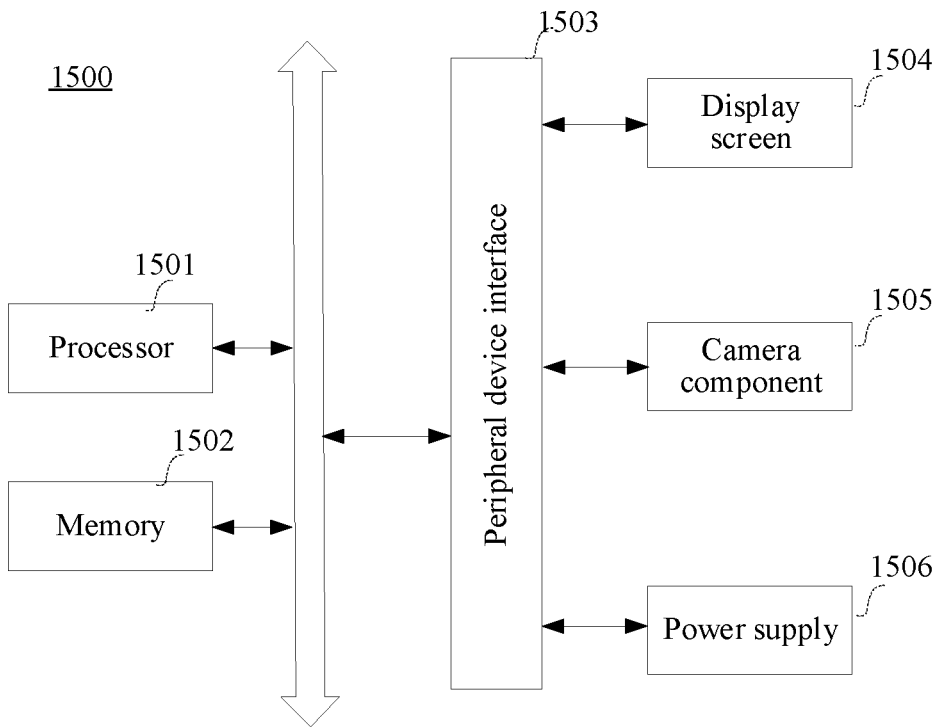
FIG. 15 is a schematic structural diagram of a terminal according to embodiment(s) of the present disclosure.

A description is made by using an example in which the computing device is a terminal. FIG. 15 shows a schematic structural diagram of a terminal 1500 according to an exemplary embodiment of the present disclosure. The terminal 1500 includes a processor 1501 and a memory 1502.

The processor 1501 may include one or more processing cores, for example, a 4-core processor or an 8-core processor. The processor 1501 may be implemented in at least one hardware form of a digital signal processor (DSP), a field-programmable gate array (FPGA), and a programmable logic array (PLA).

The memory 1502 may include one or more computer-readable storage media. The computer-readable storage medium may be non-transient. The memory 1502 may further include a high-speed random access memory and a nonvolatile memory, for example, one or more disk storage devices or flash storage devices. In some embodiments, a non-transitory computer-readable storage medium in the memory 1502 is configured to store at least one piece of program code, the at least one piece of program code being configured to be included by the processor 1501 to implement the method for determining an item name provided in the method embodiments of the present disclosure.

In some embodiments, the terminal 1500 may include a peripheral device interface 1503 and at least one peripheral device. The processor 1501, the memory 1502, and the peripheral device interface 1503 may be connected by a bus or a signal line. Each peripheral device may be connected to the peripheral device interface 1503 by using a bus, a signal cable, or a circuit board. In certain embodiment(s), the peripheral device includes: at least one of a display screen 1504, a camera component 1505, and a power supply 1506.

The peripheral device interface 1503 may be configured to connect the at least one peripheral device related to input/output (I/O) to the processor 1501 and the memory 1502.

The display screen 1504 is configured to display a user interface (UI). The UI may include a graph, text, an icon, a video, and any combination thereof. When the display screen 1504 is a touch display screen, the display screen 1504 is further capable of collecting touch signals on or above a surface of the display screen 1504. The touch signal may be inputted to the processor 1501 as a control signal for processing. In this scenario, the display screen 1504 may be further configured to provide a virtual button and/or a virtual keyboard that are/is also referred to as a soft button and/or a soft keyboard. In some embodiments, there may be one display screen 1504, disposed on a front panel of the terminal 1500. In other embodiments, there may be at least two display screens 1504 that are respectively disposed on different surfaces of the terminal 1500 or folded. In still other embodiments, the display screen 1504 may be a flexible display screen, disposed on a curved surface or a folded surface of the terminal 1500. Even, the display screen 1504 may be further set in a non-rectangular irregular pattern, namely, a special-shaped screen. The display screen 1504 may be prepared by using materials such as a liquid crystal display (LCD), an organic light-emitting diode (OLED), or the like.

The camera component 1505 is configured to capture images or videos. In certain embodiment(s), the camera component 1505 includes a front-facing camera and a rear-facing camera. Generally, the front-facing camera is disposed on a front panel of the terminal 1500, and the rear-facing camera is disposed on a rear surface of the terminal 1500. In some embodiments, there are at least two rear cameras, which are respectively any of a main camera, a depth-of-field camera, a wide-angle camera, and a telephoto camera, to achieve background blur through fusion of the main camera and the depth-of-field camera, panoramic photographing and virtual reality (VR) photographing through fusion of the main camera and the wide-angle camera, or other fusion photographing functions. In some embodiments, the camera component 1505 may further include a flash. The flash may be a monochrome temperature flash, or may be a double color temperature flash. The double color temperature flash refers to a combination of a warm light flash and a cold light flash, and may be used for light compensation under different color temperatures.

The power supply 1506 is configured to supply power to components in the terminal 1500. The power supply 1506 may be an alternating-current power supply, a direct-current power supply, a disposable battery, or a rechargeable battery. When the power supply 1506 includes the rechargeable battery, the rechargeable battery may support wired charging or wireless charging. The rechargeable battery may be further configured to support a fast charging technology.

A person skilled in the art may understand that the structure shown in FIG. 15 does not constitute a limitation to the terminal 1500, and the terminal may include more or fewer components than those shown in the figure, or some components may be combined, or a different component arrangement may be used.

Figure 16:
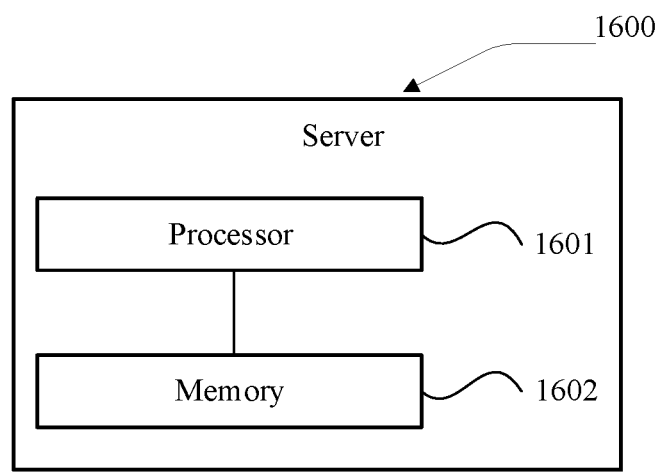
FIG. 16 is a schematic structural diagram of a server according to embodiment(s) of the present disclosure.

A description is made by using an example in which the computing device is a server. FIG. 16 is a schematic structural diagram of a server according to an embodiment of the present disclosure. The server 1600 may vary greatly due to different configurations or performance, and may include one or more processors (such as CPUs) 1601 and one or more memories 1602. The memory 1602 stores at least one piece of program code, the at least one piece of program code being loaded and executed by the processor 1601 to implement the methods provided in the method embodiments. In certain embodiment(s), the server can also have a wired or wireless network interface, a keyboard, an I/O interface and other components to facilitate I/O. The server can also include other components for implementing device functions. Details are not described herein again.

The server 1600 may be configured to perform the method for determining an item name.

An embodiment of the present disclosure further provides a computer-readable storage medium, the computer-readable storage medium storing at least one piece of program code, the at least one piece of program code being loaded by a processor to implement the following operations: obtaining a first image including a target item; selecting a plurality of reference images similar to the first image from a database, the database including a plurality of images and item information corresponding to the plurality of images, the item information corresponding to the images being used for describing items included in the images, and the item information corresponding to the images including at least item text information; performing word segmentation on item text information corresponding to the plurality of reference images to obtain a plurality of words; and extracting a key word meeting a reference condition from the plurality of words, and determining the extracted key word as an item name of the target item.

In certain embodiment(s), the at least one piece of program code is loaded by a processor to implement the following operations: determining an average value of word vectors of the plurality of words as a center vector; and determining a distance between each word vector in the word vectors and the center vector, and determining a word corresponding to a word vector having a smallest distance as the key word meeting the reference condition.

In certain embodiment(s), the at least one piece of program code is loaded by a processor to implement the following operations: performing word segmentation on the item text information corresponding to the plurality of reference images according to a plurality of reference lengths, to obtain a word whose length is equal to each reference length separately.

In certain embodiment(s), the at least one piece of program code is loaded by a processor to implement the following operations: determining appearance frequency of the plurality of words in the item text information corresponding to the plurality of reference images; and selecting, from the plurality of words, a word having a largest length and whose appearance frequency is higher than a first threshold, and determining the selected word as the key word meeting the reference condition; or selecting, from the plurality of words, a word having the highest appearance frequency, and determining the selected word as the key word meeting the reference condition.

In certain embodiment(s), the at least one piece of program code is loaded by a processor to implement the following operations: obtaining an original image including the target item; performing item detection on the original image to determine a region in which the target item is located in the original image; and extracting an image of the region from the original image to obtain the first image.

In certain embodiment(s), the database includes images belonging to a plurality of categories; and The at least one piece of program code is loaded by a processor to implement the following operations: determining a target category to which the first image belongs; and selecting a plurality of reference images belonging to the target category and similar to the first image from the database.

In certain embodiment(s), the at least one piece of program code is loaded by a processor to implement the following operations: obtaining a similarity between each category in the plurality of categories and the first image separately; and determining a category having a highest similarity with the first image in the plurality of categories as the target category.

In certain embodiment(s), the database includes a plurality of sub-databases, different sub-databases correspond to different categories, and each sub-database includes at least one image belonging to a corresponding category and item information corresponding to the at least one image; and the at least one piece of program code is loaded by a processor to implement the following operations: performing the following operations for each sub-database in the plurality of sub-databases: obtaining a similarity between each image in the sub-database and the first image; selecting a plurality of second images from the sub-database according to the similarity between each image and the first image, a similarity between the second image and the first image being higher than a similarity between another image in the sub-database and the first image; and determining an average similarity corresponding to the plurality of second images, and determining the average similarity as a similarity between a category corresponding to the sub-database and the first image.

In certain embodiment(s), the at least one piece of program code is loaded by a processor to implement the following operations: performing clustering processing on the plurality of reference images to obtain a plurality of image stacks, each image stack including at least two reference images; obtaining a similarity between each image stack and the first image according to similarities between reference images in each image stack and the first image; selecting an image stack having a highest similarity with the first image from the plurality of image stacks, and determining the selected image stack as a target image stack; and performing word segmentation on item text information corresponding to the plurality of reference images in the target image stack to obtain a plurality of words.

In certain embodiment(s), the at least one piece of program code is loaded by a processor to implement the following operations: establishing an association relationship between any two reference images in response to that a similarity between any two reference images in the plurality of reference images is higher than a second threshold; and forming reference images having an association relationship in the plurality of reference images into an image stack, to obtain the plurality of image stacks.

In certain embodiment(s), the at least one piece of program code is loaded by a processor to implement the following operations: performing searching according to the item name, to obtain item information corresponding to the item name; and displaying the item information in a current display interface.

In certain embodiment(s), the at least one piece of program code is loaded by a processor to implement the following operations: selecting a reference image having a highest quality score from the plurality of reference images, and using the selected reference image as a presentation image of the target item; and displaying the presentation image in the display interface.

An embodiment of the present disclosure further provides a computer program, the computer program storing at least one piece of program code, the at least one piece of program code being loaded and executed by a processor to implement the method for determining an item name in the embodiments.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

A person of ordinary skill in the art may understand that all or some of the steps of the embodiments may be implemented by hardware, or may be implemented by a program instructing related hardware. The program may be stored in a computer-readable storage medium. The storage medium may be a read-only memory (ROM), a magnetic disk, or an optical disc.

The descriptions are merely optional embodiments of the embodiments of the present disclosure, but are not intended to limit the embodiments of the present disclosure. Any modification, equivalent replacement, or improvement made within the spirit and principle of the embodiments of the present disclosure shall fall within the protection scope of the present disclosure.

What is claimed is:

1. A method for determining an item name of a target item, applied to a computing device, the method comprising:
   obtaining a first image including the target item;
   selecting a plurality of reference images according to the first image from a database, the database including a plurality of images and item information corresponding to the plurality of images, the item information corresponding to the images being used for describing items included in the images, and the item information corresponding to the images including item text information;
   performing word segmentation on the item text information corresponding to the plurality of reference images to obtain a plurality of words; and
   extracting a key word meeting a reference condition from the plurality of words, and determining the extracted key word as the item name of the target item,
   wherein performing the word segmentation comprises:
      performing clustering processing on the plurality of reference images to obtain a plurality of image stacks, each image stack including at least two reference images;

obtaining a similarity between each image stack and the first image according to similarities between reference images in each image stack and the first image;

selecting an image stack having a highest similarity with the first image from the plurality of image stacks, and determining the selected image stack as a target image stack; and performing word segmentation on item text information corresponding to the plurality of reference images in the target image stack to obtain a plurality of words.

2. The method according to claim 1, wherein extracting the key word comprises:

determining an average value of word vectors of the plurality of words as a center vector; and determining a distance between each word vector in the word vectors and the center vector, and determining a word corresponding to a word vector having a smallest distance as the key word meeting the reference condition.

3. The method according to claim 1, wherein performing the word segmentation further comprises:

performing word segmentation on the item text information corresponding to the plurality of reference images according to a plurality of reference lengths, to obtain a word whose length is equal to each reference length separately.

4. The method according to claim 1, wherein extracting the key word comprises:

determining appearance frequency of the plurality of words in the item text information corresponding to the plurality of reference images; and selecting, from the plurality of words, a word having a largest length and whose appearance frequency is higher than a first threshold, and determining the selected word as the key word meeting the reference condition; or selecting, from the plurality of words, a word having the highest appearance frequency, and determining the selected word as the key word meeting the reference condition.

5. The method according to claim 1, wherein obtaining the first image comprises:

obtaining an original image including the target item;

performing item detection on the original image to determine a region in which the target item is located in the original image; and extracting an image of the region from the original image to obtain the first image.

6. The method according to claim 1, wherein the database includes images belonging to a plurality of categories; and selecting the plurality of reference images comprises:

determining a target category to which the first image belongs; and selecting a plurality of reference images belonging to the target category and according to the first image from the database.

7. The method according to claim 6, wherein determining the target category comprises:

obtaining a similarity between each category in the plurality of categories and the first image separately; and determining a category having a highest similarity with the first image in the plurality of categories as the target category.

8. The method according to claim 7, wherein the database includes a plurality of sub-databases, different sub-databases correspond to different categories, and each sub-database includes at least one image belonging to a corresponding category and item information corresponding to the at least one image; and obtaining the similarity comprises:

for each sub-database in the plurality of sub-databases, performing:

obtaining a similarity between each image in the sub-database and the first image;

selecting a plurality of second images from the sub-database according to the similarity between each image and the first image, a similarity between the second image and the first image being higher than a similarity between another image in the sub-database and the first image; and determining an average similarity corresponding to the plurality of second images, and determining the average similarity as a similarity between a category corresponding to the sub-database and the first image.

9. The method according to claim 1, wherein performing the clustering processing comprises:

establishing an association relationship between any two reference images in response to that a similarity between any two reference images in the plurality of reference images is higher than a second threshold; and forming reference images having an association relationship in the plurality of reference images into an image stack, to obtain the plurality of image stacks.

10. The method according to claim 1, further comprising:

performing searching according to the item name, to obtain item information corresponding to the item name; and displaying the item information in a current display interface.

11. The method according to claim 10, further comprising:

selecting a reference image having a highest quality score from the plurality of reference images, and using the selected reference image as a presentation image of the target item; and displaying the presentation image in the display interface.

12. An apparatus for determining an item name of a target item, the apparatus comprising: a memory storing computer program instructions; and a processor coupled to the memory and configured to execute the computer program instructions and perform:

obtaining a first image including the target item;

selecting a plurality of reference images according to the first image from a database, the database including a plurality of images and item information corresponding to the plurality of images, the item information corresponding to the images being used for describing items included in the images, and the item information corresponding to the images including item text information;

performing word segmentation on the item text information corresponding to the plurality of reference images to obtain a plurality of words; and extracting a key word meeting a reference condition from the plurality of words, and determining the extracted key word as the item name of the target item, wherein performing the word segmentation comprises:

performing clustering processing on the plurality of reference images to obtain a plurality of image stacks, each image stack including at least two reference images;

obtaining a similarity between each image stack and the first image according to similarities between reference images in each image stack and the first image;

selecting an image stack having a highest similarity with the first image from the plurality of image stacks, and determining the selected image stack as a target image stack; and performing word segmentation on item text information corresponding to the plurality of reference images in the target image stack to obtain a plurality of words.

13. The apparatus of claim 12, wherein extracting the key word includes:

determining an average value of word vectors of the plurality of words as a center vector; and determining a distance between each word vector in the word vectors and the center vector, and determining a word corresponding to a word vector having a smallest distance as the key word meeting the reference condition.

14. The apparatus of claim 12, wherein performing the word segmentation further includes:

performing word segmentation on the item text information corresponding to the plurality of reference images according to a plurality of reference lengths, to obtain a word whose length is equal to each reference length separately.

15. The apparatus of claim 12, wherein extracting the key word includes:

determining appearance frequency of the plurality of words in the item text information corresponding to the plurality of reference images; and selecting, from the plurality of words, a word having a largest length and whose appearance frequency is higher than a first threshold, and determining the selected word as the key word meeting the reference condition; or selecting, from the plurality of words, a word having the highest appearance frequency, and determining the selected word as the key word meeting the reference condition.

16. The apparatus of claim 12, wherein obtaining the first image includes:

obtaining an original image including the target item;

performing item detection on the original image to determine a region in which the target item is located in the original image; and extracting an image of the region from the original image to obtain the first image.

17. The apparatus of claim 12, wherein the database includes images belonging to a plurality of categories; and selecting the plurality of reference images includes:

determining a target category to which the first image belongs; and selecting a plurality of reference images belonging to the target category and according to the first image from the database.

18. The apparatus of claim 12, wherein determining the target category includes:

obtaining a similarity between each category in the plurality of categories and the first image separately; and determining a category having a highest similarity with the first image in the plurality of categories as the target category.

19. A non-transitory computer-readable storage medium storing computer program instructions executable by at least one processor to perform:

obtaining a first image including the target item;

selecting a plurality of reference images according to the first image from a database, the database including a plurality of images and item information corresponding to the plurality of images, the item information corresponding to the images being used for describing items included in the images, and the item information corresponding to the images including item text information;

performing word segmentation on the item text information corresponding to the plurality of reference images to obtain a plurality of words; and extracting a key word meeting a reference condition from the plurality of words, and determining the extracted key word as the item name of the target item, wherein performing the word segmentation comprises:

performing clustering processing on the plurality of reference images to obtain a plurality of image stacks, each image stack including at least two reference images;

obtaining a similarity between each image stack and the first image according to similarities between reference images in each image stack and the first image;

selecting an image stack having a highest similarity with the first image from the plurality of image stacks, and determining the selected image stack as a target image stack; and performing word segmentation on item text information corresponding to the plurality of reference images in the target image stack to obtain a plurality of words.

\* \* \* \* \*